(12) United States Patent  
Hirano

(10) Patent No.: US 8,462,396 B2  
(45) Date of Patent: Jun. 11, 2013

(54) IMAGE PROCESSING DEVICE AND METHOD FOR ROTATING A SCANNED IMAGE

(75) Inventor: Yuji Hirano, Tokyo (JP)

(73) Assignee: Oki Data Corporation, Tokyo (JP)

( * ) Notice: Subject to any disclaimer, the term of this patent is extended or adjusted under 35 U.S.C. 154(b) by 855 days.

(21) Appl. No.: 12/585,763

(22) Filed: Sep. 24, 2009

(65) Prior Publication Data

US 2010/0079821 A1 Apr. 1, 2010

(30) Foreign Application Priority Data

Sep. 30, 2008 (JP) ................................ 2008-254879

(51) Int. Cl.  
*H04N 1/04* (2006.01)

(52) U.S. Cl.  
USPC ............................. 358/474; 358/448; 358/1.9

(58) Field of Classification Search  
None  
See application file for complete search history.

(56) References Cited

U.S. PATENT DOCUMENTS

| | | | | |
|---|---|---|---|---|
| 3,958,816 A | * | 5/1976 | Remmey, III | 283/38 |
| 5,301,036 A | * | 4/1994 | Barrett et al. | 358/448 |
| 5,640,647 A | * | 6/1997 | Hube | 399/84 |
| 6,954,290 B1 | * | 10/2005 | Braudaway et al. | 358/3.26 |
| 7,215,445 B2 | * | 5/2007 | Braudaway et al. | 358/3.26 |
| 7,224,496 B2 | * | 5/2007 | Lee et al. | 358/474 |
| 7,852,520 B2 | * | 12/2010 | Iida | 358/474 |
| 7,889,362 B2 | * | 2/2011 | Tsukuba et al. | 358/1.12 |
| 2005/0073733 A1 | * | 4/2005 | Kim | 358/528 |
| 2006/0033967 A1 | * | 2/2006 | Brunner | 358/474 |
| 2007/0013972 A1 | * | 1/2007 | Sheng | 358/474 |

FOREIGN PATENT DOCUMENTS

| | | | |
|---|---|---|---|
| JP | A-H05-110813 | | 4/1993 |
| JP | 06-243287 A | | 9/1994 |
| JP | 06-311333 A | | 11/1994 |
| JP | 08-044254 A | | 2/1996 |
| JP | 09-282325 A | | 10/1997 |
| JP | 11-015224 A | | 1/1999 |
| JP | 2001-061051 A | | 3/2001 |
| JP | 2003-324599 A | | 11/2003 |
| JP | 2006-254073 A | | 9/2006 |
| JP | 2008-092452 A | | 4/2008 |
| JP | 2008-191562 A | | 8/2008 |
| JP | 2008191562 A | * | 8/2008 |

\* cited by examiner

*Primary Examiner* — Dung Tran  
(74) *Attorney, Agent, or Firm* — Posz Law Group, PLC

(57) ABSTRACT

A image processing device includes an image scanning unit for scanning a plurality of pages of a book and generating image data, a storage unit in which data related to direction of the image data is stored, a direction determination unit for determining a direction of a page unit of the image data, and an image rotation unit for changing a direction of a page unit of the image data based on the direction determined by the direction determination unit.

16 Claims, 24 Drawing Sheets

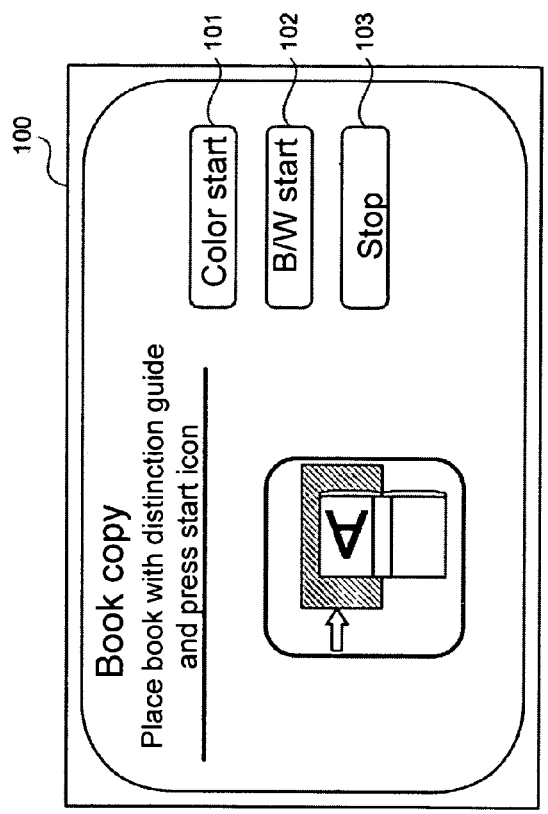
Fig. 25
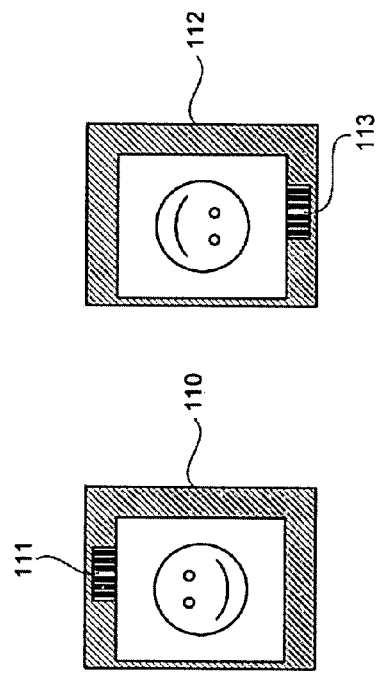
Fig. 26A
Fig. 26B

IMAGE PROCESSING DEVICE AND METHOD FOR ROTATING A SCANNED IMAGE

CROSS REFERENCE TO RELATED APPLICATION

The present application is related to, claims priority from and incorporates by reference Japanese patent application No. 2008-254879, filed on Sep. 30, 2008.

TECHNICAL FIELD

This application is related to an image processing device that outputs image data inputted through an image scanning device after the image data is aligned in the same orientation based on a predetermined control, and a method of the image processing.

BACKGROUND

In a conventional image scanning device that is capable of scanning an A4 size paper and has a platen cover hinged at a long side of the A4 size paper, the platen cover is required to be opened at a 180-degree angle to scan one page and then another page of a A4 size book by parallel shifting the book on a platen. When the platen cover cannot be opened at a 180-degree angle, it is impossible to scan one page and then another page of the A4 size book by parallel shifting the book on the platen. Due to the installation environment of the image scanning device, if the platen cover cannot be opened at a 180-degree angle, the book interferes with the platen cover during the scanning operation (parallel shifting the book on the platen).

In this situation, after an image on one page of a pair of adjacent open pages of a book is scanned, the book is horizontally inverted (the positions of the bottom and top ends of the book are reversed) on a platen to scan an image on the adjacent page of the pair of open pages of the book. There is a technology to align a direction of a scanned image to a primary direction of a scanned image through rotating the scanned image by 90 degrees, for example, see Japanese laid-open patent application publication No. H5-110813.

However, there is a problem in that it is difficult to use the technology described above. While several pages of a book are scanned continuously, if a scanned image, which is scanned after the scanning pages are inverted, is printed as it is, the direction of an image in a middle page is opposite to that of other images of other pages.

SUMMARY

An object of the present application is to provide an image processing device that outputs a medium in which the directions, or orientations, of the images on all pages are aligned in the same direction, even though the directions of the images on adjacent pages, when scanned by the image scanning device, are opposite. After an open book is placed on a platen of the image scanning device, a user operates an operation panel. Even though the directions of the images on adjacent pages scanned by the image scanning device are opposite to one another, a page that has an image scanned in an opposite direction to a chosen direction is outputted after the image is inverted, so that and all pages ultimately have images oriented in the same direction.

In order to resolve the problem described above, an image processing device according to the present application includes an image scanning unit for scanning a plurality of pages of a book and generating image data, a storage unit in which data related to direction of the image data is stored, a direction determination unit for determining a direction of a page unit of the image data, and an image rotation unit for changing a direction of a page unit of the image data based on the direction determined by the direction determination unit.

In the image processing device according to the present application, even though the orientations of the images on adjacent pages scanned by the image scanning device are reversed, a page that has an image scanned in an opposite direction to a certain direction is outputted after the image is inverted. Therefore, all pages ultimately have their images oriented in the same direction.

BRIEF DESCRIPTION OF DRAWINGS

FIG. 25 is a schematic view of a book copy screen displaying an operation panel of a fourth embodiment of an image processing device according to the present application.

FIG. 26A and FIG. 26B are schematic views of image data of an image on a page of a book tucking with a distinction guide scanned by a scanning device of a fourth embodiment of an image processing device according to the present application.

DETAILED DESCRIPTION

A description of an embodiment of an image processing device according to the present application in detail with reference to the drawings follows. However, an image processing device according to the present application is not limited to the description below and a wide variety of alterations and modifications are possible as far as they do not depart from the spirit and scope of the attached claims.

First Embodiment

Figure 1:
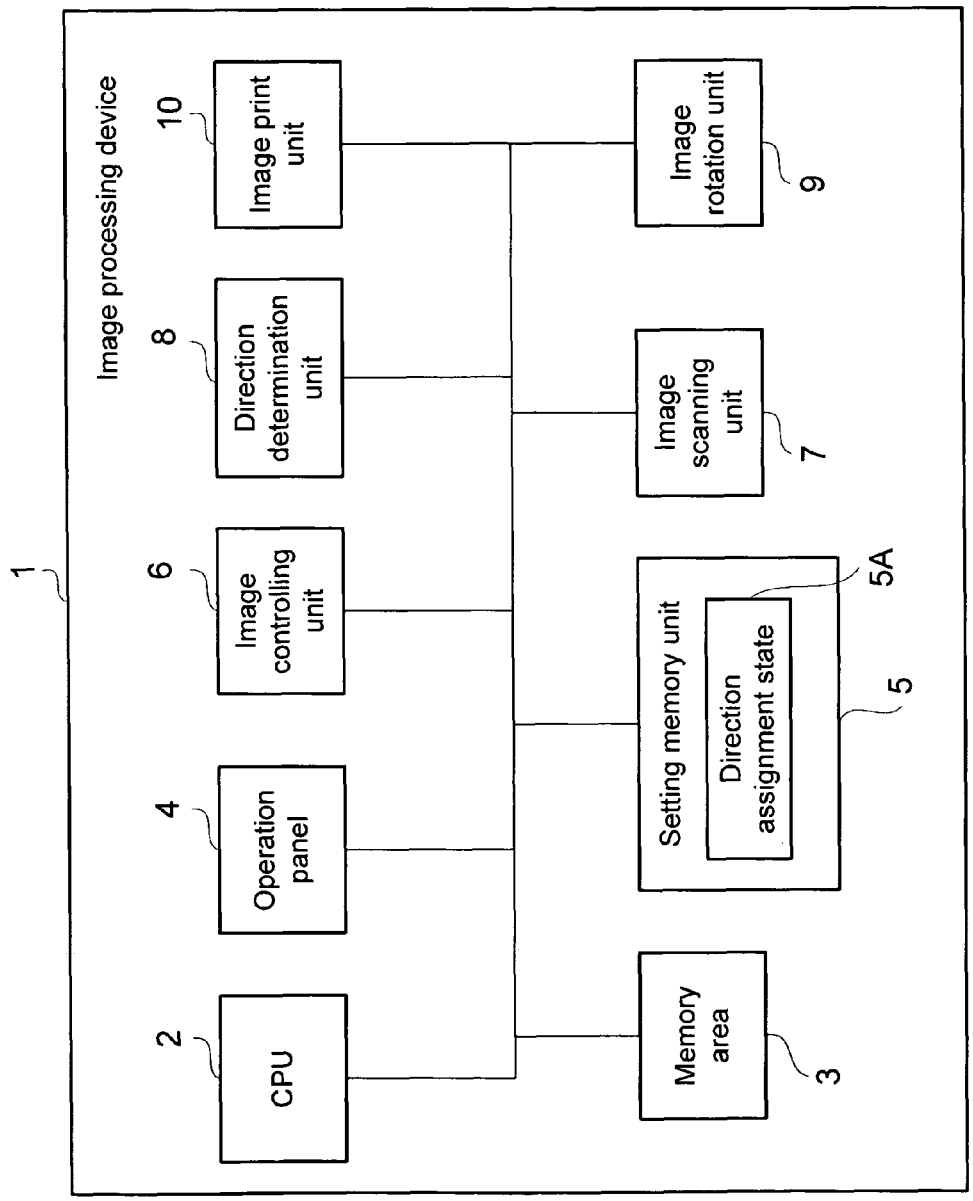
FIG. 1 is a schematic view of first and second embodiments of an image processing device according to the present application.

An explanation of an image processing device 1 according to a first embodiment is given below with reference to FIG. 1. FIG. 1 is a schematic view of an image processing device 1.

An image processing device 1 scans images on several pages of a book and converts them into image data. Herein, the word "book" refers not only to common hardcover books but all bound sheet materials that are hinged along a center spine and typically have multiple pages of information oriented in a common direction. After the image processing device 1 rotates image data in a certain direction, the image processing device 1 prints the image data on a recording medium or stores the image data in a memory. This image processing device 1 is configured with a CPU 2, a memory area 3, an operation panel 4, a setting memory unit 5, an image controlling unit 6, an image scanning unit 7, a direction determination unit 8, an image rotation unit 9, and an image print unit 10. A detailed explanation of each structure configured for an image processing device 1 is given below.

The CPU 2 in the image processing device 1 is configured with a microprocessor and other components commonly provided in a CPU. The CPU 2 controls the overall image processing device 1 by executing a program, which is stored as firmware. A memory area 3, or storage unit, is configured with a RAM, a flash memory, or the like. Information required to execute a program and image data obtained by scanning a book are temporarily stored in the memory area 3. An operation panel 4 is an operation unit for a user of the image processing device 1 to use when inputting information. In other words, the operation panel 4 is a user interface device. The operation panel 4 also displays the operating state of the image processing device 1 and various types of other information. A setting memory unit 5 is configured with an electrically readable and writable flash memory. Various settings for executing programs are stored in the setting memory unit 5. A direction assignment state 5A provided in the setting memory unit 5 stores a scanning direction of a book, which a user assigns through the operation panel 4, as a numeric value. Specifically, for example, when a top end of a book is placed at the left side of an image scanning unit 7, which is a starting position of a scanning operation, the direction assignment state 5A is stored as a numeric value "0," as a scanning direction. Similarly, for example, when a bottom end of a book is placed at the left side of an image scanning unit 7, which is a starting position of a scanning operation, the direction assignment state 5A is stored as a numeric value "1," as a scanning direction.

An image controlling unit 6 in the image processing device 1 instructs certain operations to each of configured units for processing image data. An image scanning unit 7 scans an image printed on a book that a user of the image processing device 1 places on a platen and converts it to image data. A detailed structure of the image scanning unit 7 is explained later. A direction determination unit 8 determines whether it is necessary to rotate image data created from a scanned page by the image scanning unit 7 based on the direction of the book that is assigned by a user of the image processing device 1 through an operation panel 4. An image rotation unit 9 rotates image data created from a scanned page by the image scanning unit 7 based on the determination result of the direction determination unit 8. An image print unit 10 prints image data that was scanned by the image scanning unit 7. The printed images are aligned in the same direction on a recording medium after the following processes (not shown): image forming by an image forming unit, transfer by a transfer unit, and fixing by a fixing unit.

Figure 2:
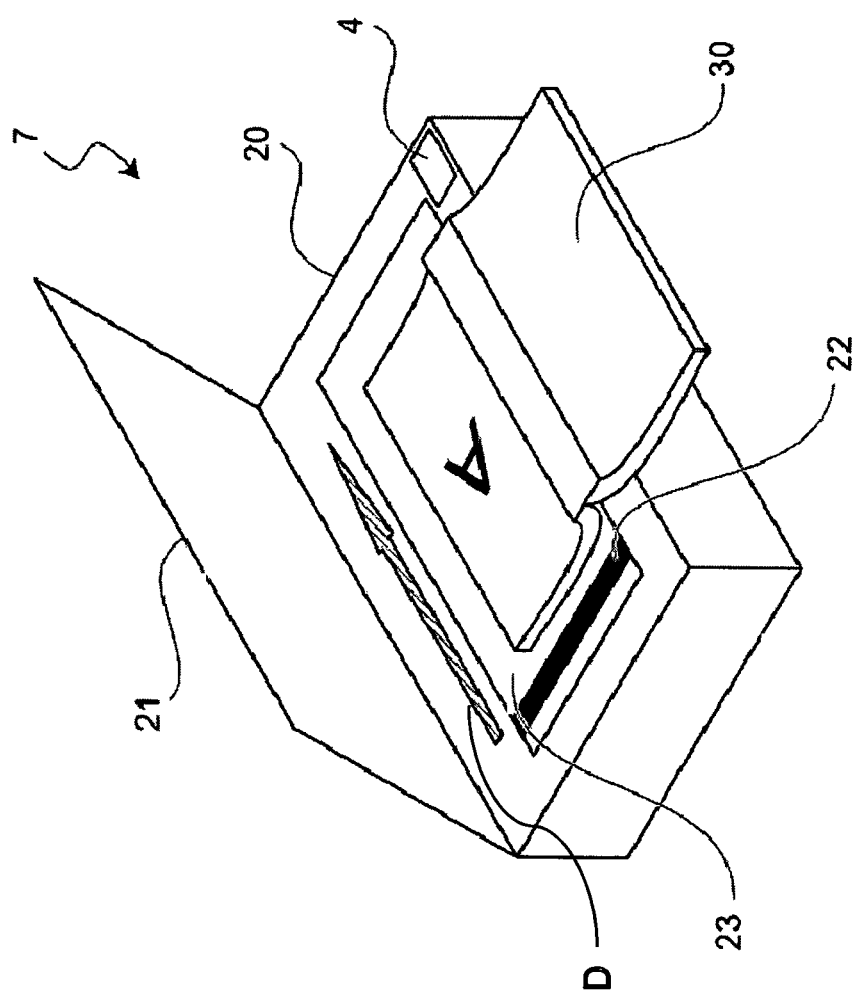
FIG. 2 is a schematic view of a first embodiment of an image processing device according to the present application and shows an image printed on a page of a book being scanned in a scanning direction from its top end to its bottom end by an image scanning unit.
Figure 3:
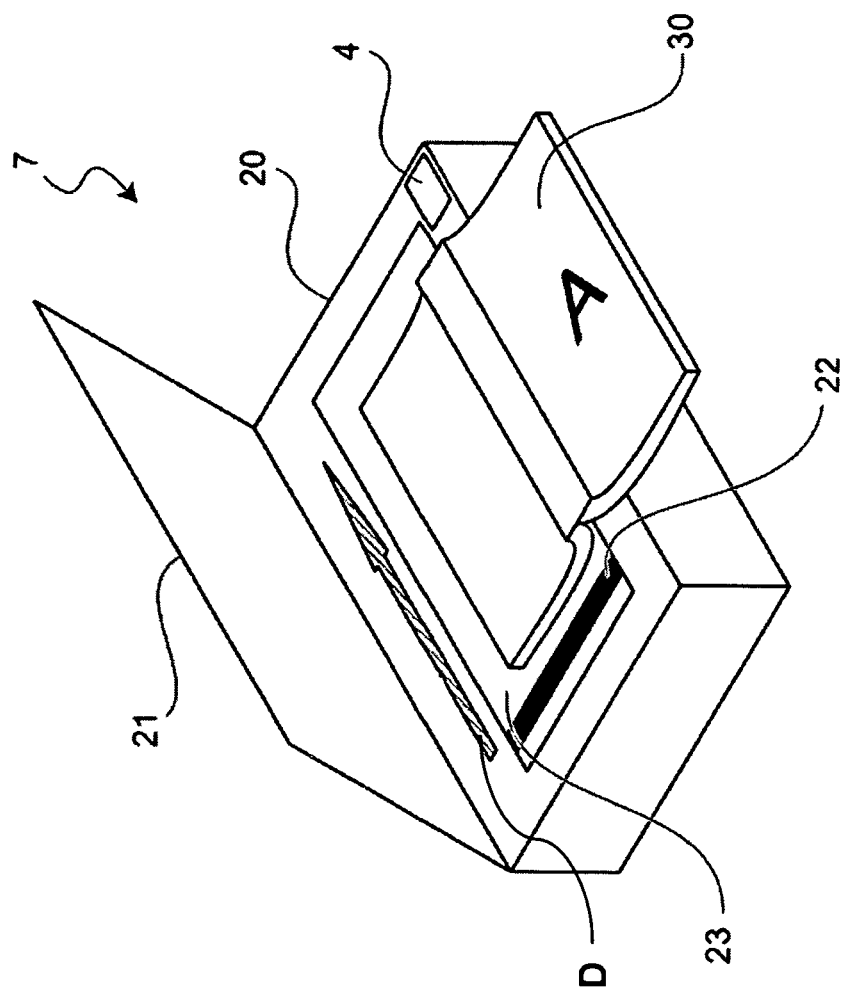
FIG. 3 is a schematic view of a first embodiment of an image processing device according to the present application and shows an image printed on a page of a book located in a horizontally inverted position (its top end and bottom end have been reversed from the positions of FIG. 2) compared to FIG. 2 being scanned in a scanning direction from its bottom end to its top end by an image scanning unit.

Next, a detailed structure and operation with respect to an image scanning unit 7 configured in the image processing device 1 are given below with reference to FIGS. 2 and 3. FIG. 2 is a schematic view of a scanning operation in which an image printed on a book 30 is scanned in a scanning direction from the top end to the bottom end by the image scanning unit 7. FIG. 3 is a schematic view of a scanning operation in which an image printed on a book 30 located in a horizontally inverted position compared to FIG. 2 is scanned in a scanning direction from the bottom end to the top end by the image scanning unit 7.

The following is a detailed description of the structure of the image scanning unit 7. The scanning unit 7 includes a housing 20, a platen cover 21, an image sensor 22, and a platen (the table on which a book is placed) 23. The scanning unit 7 scans an image printed on a page of a book 30 and converts it to image data (or generates image data). The book 30 is, for example, a book with printed images including writing, pictures, photos, and on the like. The image scanning unit 7 has an operation panel 4. Specifically, the operation panel 4 is provided at the periphery of a platen 23 that is made of a transparent glass located at an upper surface of a housing 20. The housing 20, one of the structures of the image scanning unit 7, is generally box-shaped and made of a plastic material. The housing 20 has an image sensor 22 inside of the housing 20 and has a platen 23 at an upper surface of the housing 20. A platen cover 21 is generally plate-shaped and made of plastic material. The platen cover 21 is pivotally fixed to the side of the housing 20. Since the platen cover 21 covers the platen 23 on which a book 30 is placed, the platen cover 21 blocks stray light from the outside when an image printed on the book 30 is scanned by the image sensor 22.

An image sensor 22, one of the structures for the image scanning unit 7, is configured with, among other things, a light source, a lens, an off-axis mirror, a detector, and a scanning unit (all of aforementioned structures are not shown). Illumination light from the light source is reflected by the book 30. Spherical aberration, astigmatism, and other phenomena of the reflected light are corrected. The detector receives the corrected light. In the image sensor 22, for example, the following structures are used: a fluorescent lamp is used for the light source; an aspheric lens is used for a lens; a plane mirror is used for a mirror; and a CCD is used for a detector. The image sensor 22 is provided inside of the housing 20. A scanning unit of the image sensor 22 is configured with, among other things, a mount base, a rail, a drive belt, and a drive motor (all of aforementioned structures are not shown). The scanning unit, on which the light source, the lens, the off-axis mirror, and the detector are mounted, is a scanning part to scan an image printed on the entire surface of a book 30. The platen 23 is made of transparent glass. A book 30, from which image data is created, is put on the platen 23. The platen 23 is provided at a location where illumination light from the image sensor 22 is transmitted, reflected light from a book 30 placed on the platen 23 is transmitted, and the reflected light is received by the image sensor 22.

A detailed description of the operation of the image scanning unit 7 follows. Scanning an image printed on a page of a book 30 in a scanning direction from the top end to the bottom end is explained with reference to FIG. 2. The book 30 is placed on the platen 23 of the image scanning unit 7, with the top end of a printed image of the book 30 placed in the vicinity of the left end of the platen 23 in the image scanning unit 7 in FIG. 2, which is a starting position of a scanning operation. When a user operates an operation panel 4 to run the image scanning unit 7, an image sensor 22, which is located in the far left side of the platen 23 in FIG. 2, scans the page of the book 30 in a direction D from the left toward the far right side in FIG. 2. Then, the image sensor 22 returns to its original position at the far left side. Scanning an image printed on a page of the book 30 in a scanning direction from the bottom end to the top end is explained with reference to FIG. 3. A book 30, which is placed on a platen 23, may be shifted on the platen 23 without changing its orientation to scan a second one of a pair of open pages after a first one of the open pages was scanned. However, it may be that the book 30 cannot be moved without changing its orientation because there may be interference between the book 30 and the platen cover 21. In order to avoid this problem, the book 30 is horizontally inverted (the positions of the bottom end and the top end are reversed) compared to FIG. 2 and is placed on the platen 23 of the image scanning unit 7 to scan an image printed on a page of the book 30 with the bottom end of the printed image of the book 30 placed in the vicinity of the left side of the platen 23 in the image scanning unit 7 in FIG. 3, which is the starting position of a scanning operation. When a user activates the image scanning unit 7 through a manipulation of the operation panel 4, an image sensor 22, which is located in the far left side of the platen 23 in FIG. 3, scans a page of the book 30 in a direction D from the left toward the far right side in FIG. 3. Then, the image sensor 22 returns to its original position at the far left side. The method of operation of the operation panel 4 is given below in detail.

Figure 4:
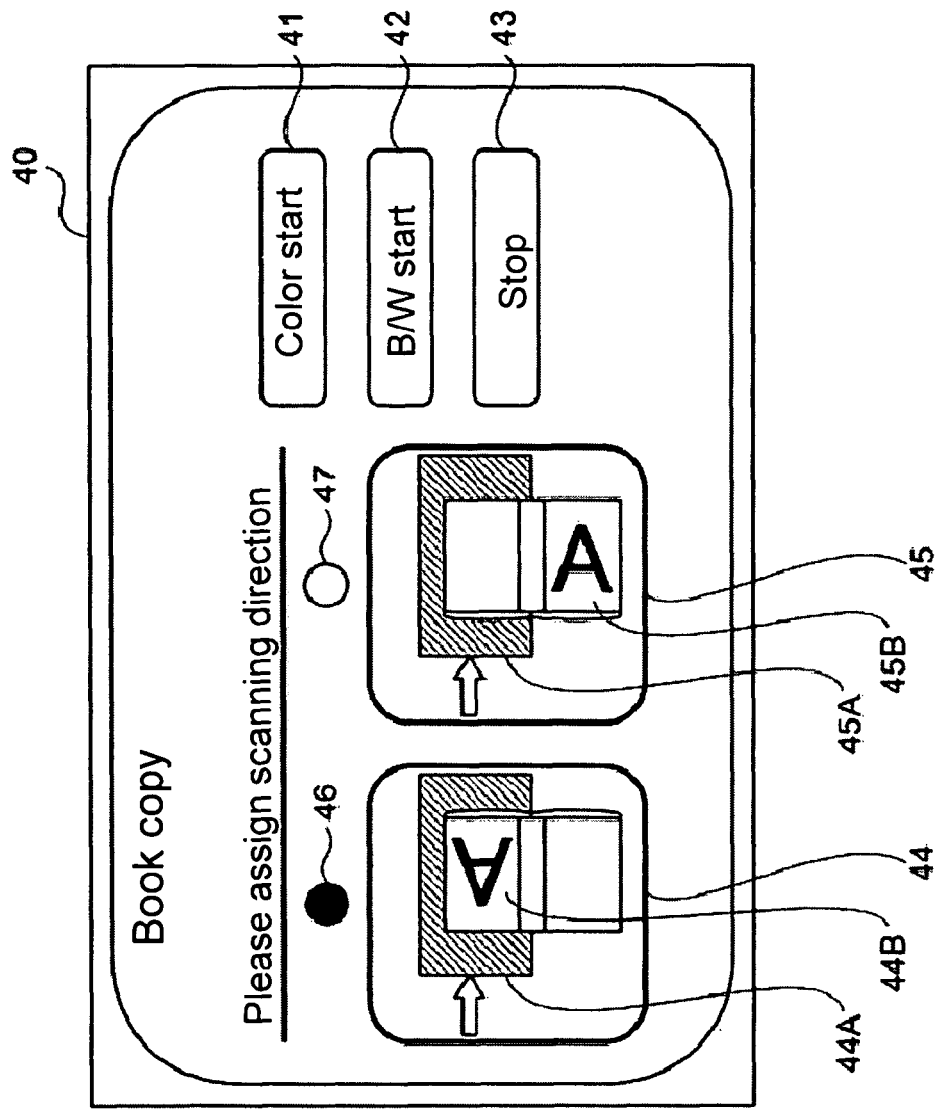
FIG. 4 is a schematic view of a book copy screen displaying an operation panel of a first embodiment of an image processing device according to the present application.
Figure 5:
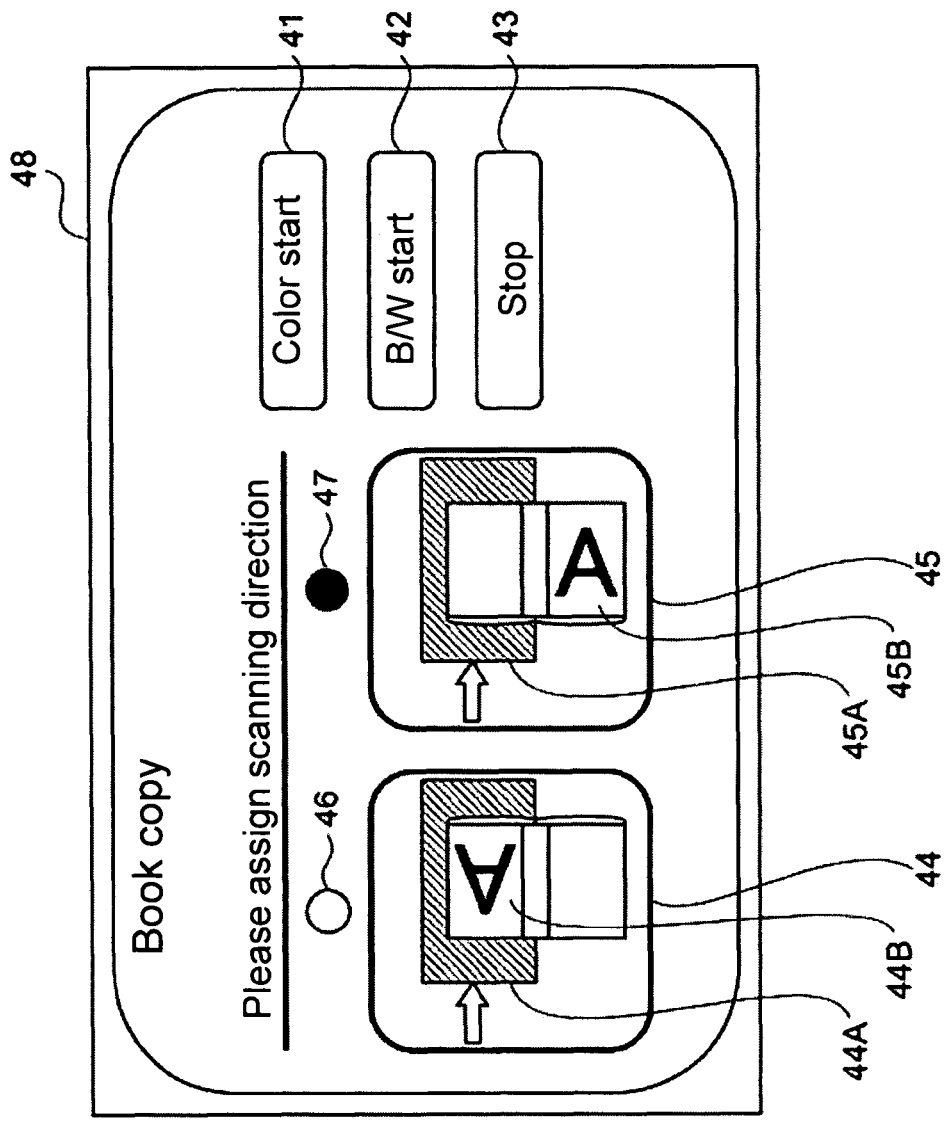
FIG. 5 is a schematic view of a book copy screen displaying an operation panel of a first embodiment of an image processing device according to the present application.

The following is a description of the structure and operation of the operation panel 4 provided at the image scanning unit 7 with reference to FIGS. 4 and 5. FIGS. 4 and 5 are schematic views of a screen of a book copy screen 40, 48 displayed by the operation panel 4.

A book copy screen 40 of the operation panel 4 (as an input device) has a color start icon 41, a black and white (B/W) start icon 42, a stop icon 43, a top end scanning direction assignment icon 44, and a bottom end scanning direction assignment icon 45. A user of the image processing device 1 sets up scanning conditions of the book 30 placed on the image scanning unit 7 by selecting and pressing those icons. FIG. 4 is a schematic view showing the book copy screen 40 of the operation panel 4 under a status of pressing the top end scanning direction assignment icon 44 that is used for scanning an image printed on the book 30 in a scanning direction from the top end to the bottom end. Similarly, FIG. 5 is a schematic view showing the book copy screen 48 of the operation panel 4 under a status of pressing the bottom end scanning direction assignment icon 45, which is used for scanning an image printed on the book 30 in a scanning direction from the bottom end to the top end. Each icon provided in the book copy screen 40, 48 is explained below.

A color start icon 41 provided in the book copy screen 40, 48 instructs to start a color copy. When a user presses the color start icon 41, an image printed on the book 30 located on the platen 23 of the image scanning unit 7 is scanned by the image sensor 22 and converted it into color image data. Similarly, a B/W start icon 42 provided in the book copy screen 40, 48 instructs to start a B/W copy. When a user presses the B/W start icon 42, an image printed on the book 30 located on the platen 23 of the image scanning unit 7 is scanned by the image sensor 22 and converted it into B/W image data. A stop icon 43 provided in the book copy screen 40, 48 instructs to stop a copy operation of the book 30. When a user presses the stop icon 43, an operation of the image scanning unit 7 is stopped.

The top end scanning direction assignment icon 44, which is provided in the book copy screen 40, 48, is a first selector. The top end scanning direction assignment icon 44 is used when an image printed on the book 30 is scanned in a direction from the top end to the bottom end. When the book 30 is placed on the platen 23 of the image scanning unit 7, with the top end of an image printed on the book 30 placed in the vicinity of the left side of the platen 23 in the image scanning unit 7 in FIGS. 4 and 5, which is a starting position of a scanning operation, a user presses the top end scanning direction assignment icon 44. In FIGS. 4 and 5, a platen mark 44A within the top end scanning direction assignment icon 44 represents the platen 23, and a book mark 44B within the top end scanning direction assignment icon 44 represents the book 30. A writing direction of letters of the book 30 is the same as the writing direction of the letter "A" of the book mark 44B in FIGS. 4 and 5. Similarly, the bottom end scanning direction assignment icon 45, which is provided in the book copy screen 40, 48, is a second selector. The bottom end scanning direction assignment icon 45 is used when an image printed on the book 30 is scanned in a direction from the bottom end to the top end. When the book 30 is placed on the platen 23 of the image scanning unit 7 with the bottom end of an image printed on the book 30 placed in the vicinity of the left side of the platen 23 in the image scanning unit 7 in FIGS. 4 and 5, which is a starting position of a scanning operation, a user presses the bottom end scanning direction assignment icon 45. In FIGS. 4 and 5, a platen mark 45A within the bottom end scanning direction assignment icon 45 represents the platen 23, and a book mark 45B within the bottom end scanning direction assignment icon 45 represents the book 30. The writing direction of letters of the book 30 is the same as the writing direction of the letter "A" of the book mark 45B in FIGS. 4 and 5.

A top end selection indication lamp 46 provided in the book copy screen 40, 48 illuminates when a user presses the top end scanning direction assignment icon 44. When a user selects the color start icon 41 or the B/W start icon 42, the top end selection indication lamp 46 indicates that an image printed on the book 30 is scanned in a direction from the top end to the bottom end. Similarly, a bottom end selection indication lamp 47 provided in the book copy screen 40, 48 illuminates when a user presses the bottom end scanning direction assignment icon 45. When a user selects the color start icon 41 or the B/W start icon 42, the bottom end selection indication lamp 47 indicates that an image printed on the book 30 is scanned in a direction from the bottom end to the top end.

Figure 6:
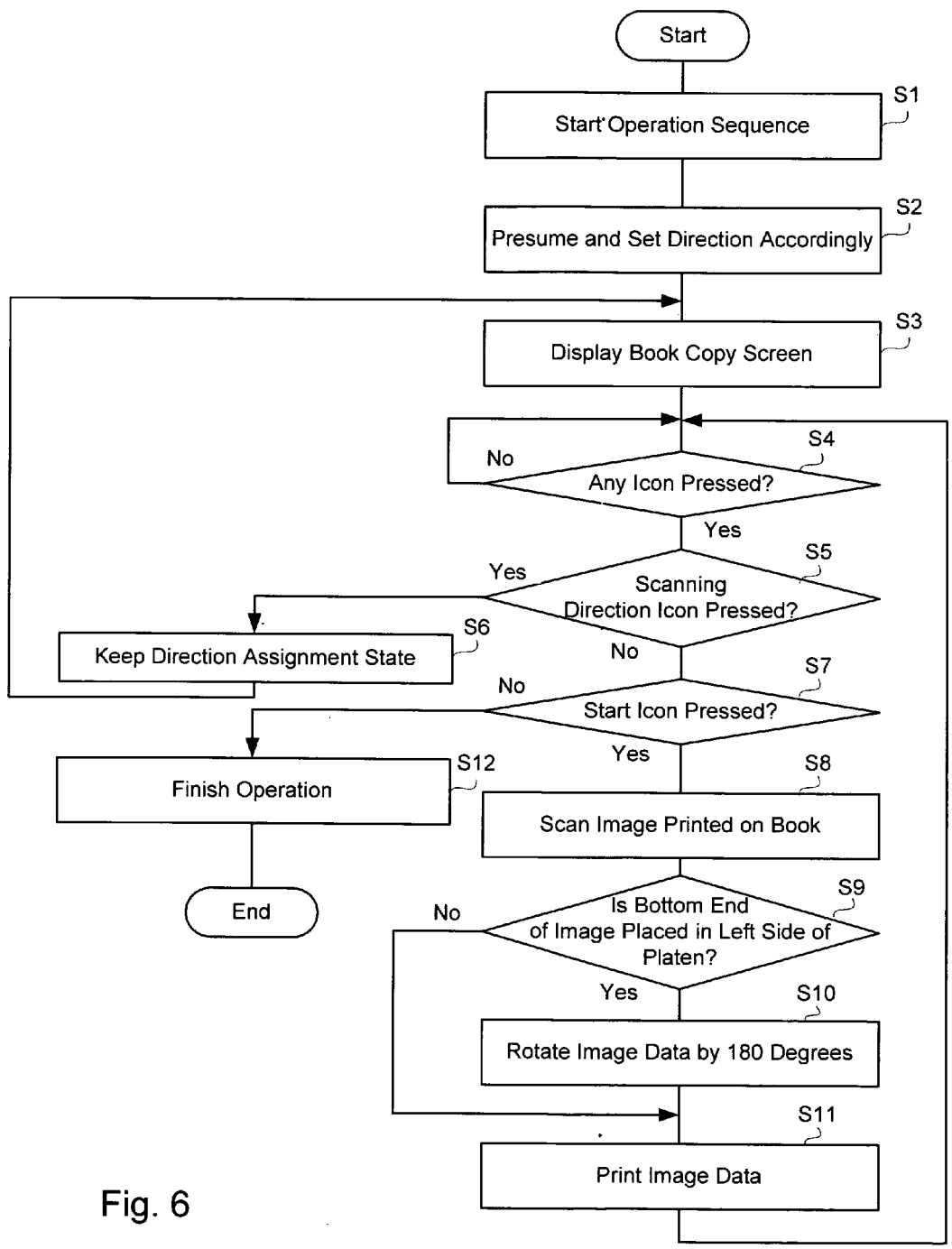
FIG. 6 is a flow diagram of an operation related to a first embodiment of an image processing device according to the present application.

The following is a description of the operation of the image processing device 1 according to the present application. FIG. 6 shows a flow diagram of the operation of the image processing device 1.

When a user of the image processing device 1 places the book 30 on the platen 23 of the image scanning unit 7 and operates the operation panel 4 provided at the image scanning unit 7, an operation sequence is started with respect to the image processing device 1 (S1). A direction assignment state 5A provided in a setting memory unit 5 is set as a "0" value based on the control by an image controlling unit 6 provided in the image processing device 1. In other words, this is a setting that presumes that the top end of an image printed on the book 30 is placed in the vicinity of the left side of the platen 23 in the image scanning unit 7, which is a starting position of a scanning operation (S2). A book copy screen 40 is displayed on the operation panel 4 based on the control by the image controlling unit 6 (S3). Then, in step S4, the image controlling unit 6 determines whether any icons provided in the book copy screen 40, 48 have been pressed through the operation panel 4. When an icon has been pressed (Yes), the operation proceeds to step S5 from step S4. When no icon has been pressed (No), step S4 is repeated. In step S5, the image controlling unit 6 determines whether the pressed icon in the book copy screen 40, 48 through the operation panel 4 is the top end scanning direction assignment icon 44 or the bottom end scanning direction assignment icon 45. When, at step S5, the pressed icon is the top end scanning direction assignment icon 44 or the bottom end scanning direction assignment icon 45 (Yes), the operation proceeds to step S6. At step S5, if the pressed icon is not the top end scanning direction assignment icon 44 nor the bottom end scanning direction assignment icon 45 (No), the operation proceeds to step S7 from step S5.

After the operation proceeds from step S5 to step S6, when the pressed icon is the top end scanning direction assignment icon 44, the top end selection indication lamp 46 illuminates and a "0" value for the direction assignment state 5A is kept as the currently assigned scanning direction based on the control by the image controlling unit 6. Similarly, after the operation proceeds from step S5 to step S6, when the pressed icon is the bottom end scanning direction assignment icon 45, the bottom end selection indication lamp 47 illuminates and a "1" value for the direction assignment state 5A is kept as the currently assigned scanning direction based on the control by the image controlling unit 6. Then, from step S6, the operation returns to step S3. When the operation proceeds from step S5 to step S7, the image controlling unit 6 determines whether a pressed icon in the book copy screen 40, 48 through the operation panel 4 is the color start icon 41 or the B/W start icon 42. When, in step S7, the pressed icon is either the color start icon 41 or the B/W start icon 42 (Yes), the operation proceeds to step S8 from step S7. When the pressed icon is not either the color start icon 41 or the B/W start icon 42 (No), the operation proceeds to step S12 from step S7. After the operation proceeds from step S7 to step S8, the operation panel 4 notifies the image controlling unit 6 of the copy operation start. Then, the image controlling unit 6 instructs the image scanning unit 7 to scan an image printed on the book 30. The image scanning unit 7 scans an image printed on the book 30 and converts the scanned image into image data. The image data is transferred from the image scanning unit 7 to a memory area 3 and is stored in the memory area 3. Then, in step S8, the image scanning unit 7 notifies the image controlling unit 6 of the completion of scanning of the page of the book 30.

In step S9, based on an instruction from the image controlling unit 6, a direction determination unit 8 determines whether or not the book 30 is placed on the platen 23 of the image scanning unit 7 with the bottom end of an image printed on the book 30 placed in the vicinity of the left side of the platen 23 in the image scanning unit 7, shown in FIG. 3. Specifically, the direction determination unit 8 determines whether or not a setting value of the direction assignment state 5A in the setting memory unit 5 is "1". When the setting value of the direction assignment state 5A is "1" (Yes), the operation proceeds to step S10 from step S9. When the setting value of the direction assignment state 5A is not "1" (No), the operation proceeds to step S11 from step S9. The direction determination unit 8 sends the determination result to the image controlling unit 6. In step S10, the image controlling unit 6 instructs an image rotation unit 9 to rotate the direction of the image data scanned by the image scanning unit 7 by 180 degrees. After the image rotation unit 9 rotates the direction of image data stored in the memory area 3 by 180 degrees and re-stores the rotated image data into the memory area 3, the image rotation unit 9 notifies the image controlling unit 6 (S10). After the operation proceeds from either steps S9 or S10 to step S11, the image controlling unit 6 instructs an image print unit 10 to print the image data. After the image print unit 10 prints the image data, the operation returns to step S4. In step S4, when a user places a subsequent page and so on of the book 30 on the platen 23 in the image scanning unit 7 and operates the operation panel 4 of the image scanning unit 7, steps after step S4 are repeatedly executed. When the operation proceeds from step S7 to step S12, i.e., when the stop icon 43 of the book copy screen 40, 48 is pressed, the image controlling unit 6 finishes a copy operation for the book 30 (S12).

In the image processing device 1 according to the first embodiment, after a user places the book 30 on the platen 23 of the image scanning unit 7, a user assigns a scanning direction for the book 30, page by page, through operation of the operation panel 4 provided at the image scanning unit 7. Thus, although the platen cover 21 interferes with the book 30, so that the book 30 cannot be shifted on the platen 23 while the book maintains a single orientation and although every other page of the book 30 is inverted (the bottom end and the top end are reversed) on the platen 23 to overcome the interference by the platen cover 21, every other image of the book 30 scanned by the image scanning unit 7 is inverted, so that all pages of the output images are oriented in the same direction Second Embodiment Next, an image processing device 15 of a second embodiment according to the present application is explained below. In the second embodiment, when a scanning direction for a first page of a book 30 is assigned, every other page of scanned data for a second or subsequent page is inverted instead of assigning a scanning direction of the book 30 for each page. Therefore, the second embodiment has the benefit of ease of settings and very simple setting operations of a scanning direction compared to the first embodiment. Other structures with respect to the image processing device 15 in the second embodiment are the same as those of the image processing device 1 in the first embodiment. In the second embodiment, structures that are different from the first embodiment are mainly explained in detail.

Figure 7:
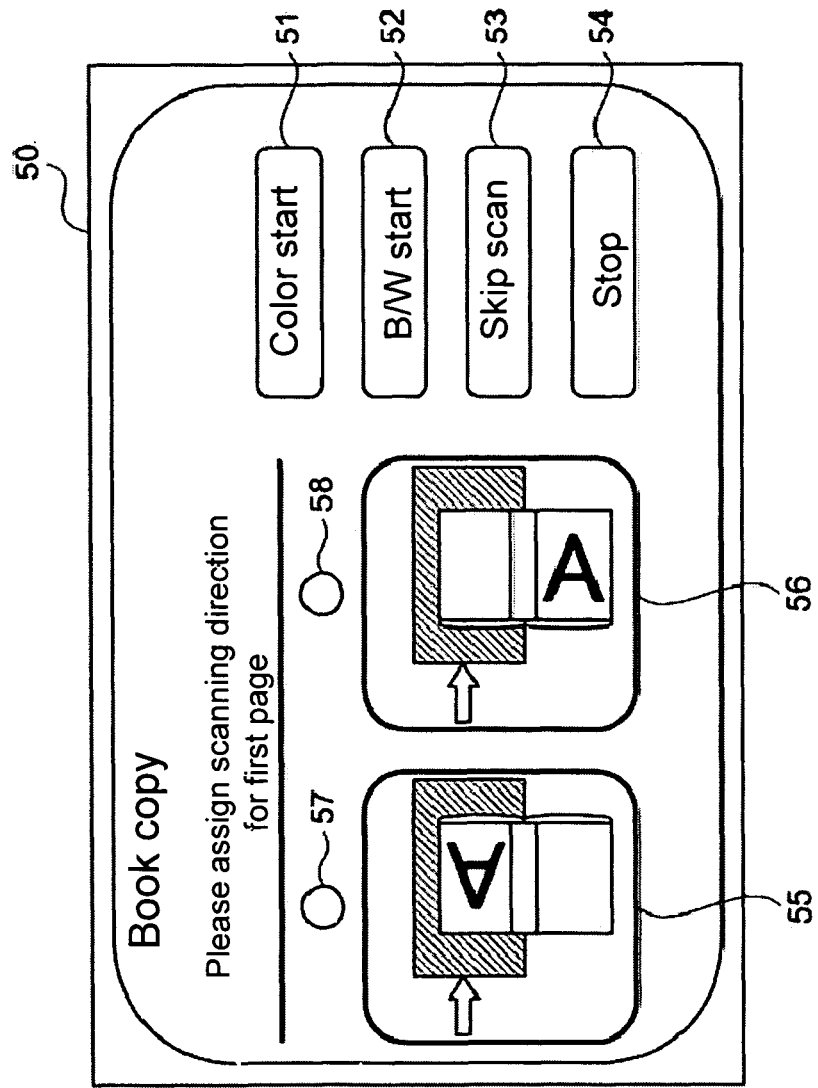
FIG. 7 is a schematic view of a book copy screen displaying an operation panel of a second embodiment of an image processing device according to the present application.
Figure 8:
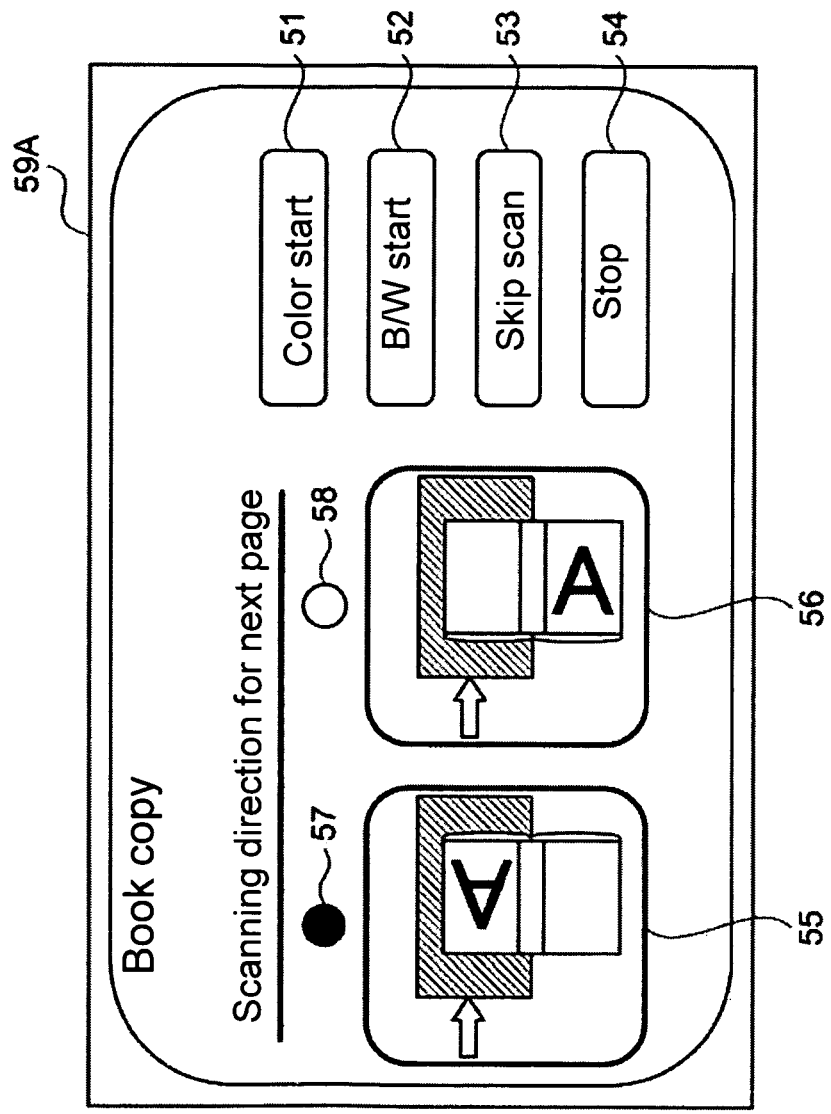
FIG. 8 is a schematic view of a book copy screen displaying an operation panel of a second embodiment of an image processing device according to the present application.
Figure 9:
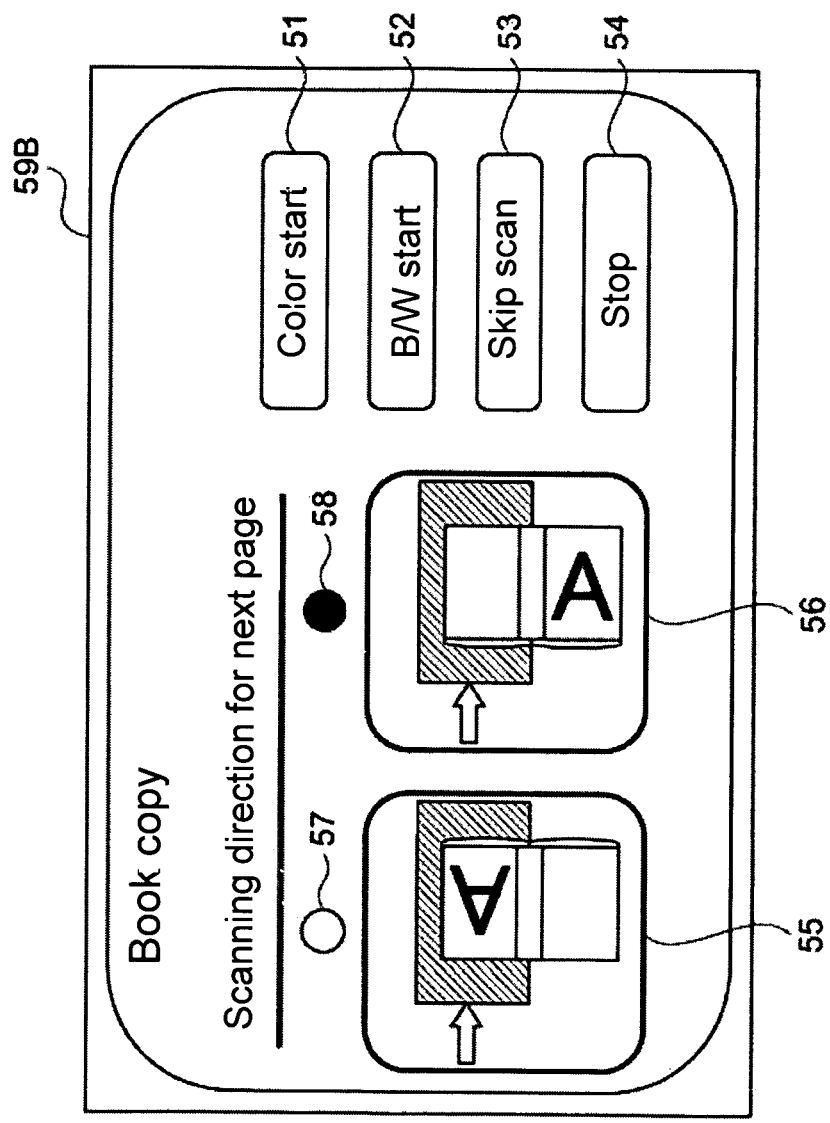
FIG. 9 is a schematic view of a book copy screen displaying an operation panel of a second embodiment of an image processing device according to the present application.

The structure and operation of the operation panel 4 provided at the image scanning unit 7 are explained in detail with reference to FIGS. 7 through 9. FIGS. 7 through 9 are schematic views of a screen of a book copy screen displayed by an operation panel 4.

A book copy screen 50 of the operation panel 4 has a color start icon 51, a black and white (B/W) start icon 52, and a stop icon 54 that are the same structures of the first embodiment. In addition to those structures, the book copy screen 50, 59A, 59B has a skip scan icon 53, a beginning page top end scanning direction assignment icon 55, and a beginning page bottom end scanning direction assignment icon 56 that are the unique structures for the second embodiment. A user of the image processing device 15 sets up scanning conditions of the book 30 placed on the image scanning unit 7 by selecting and pressing those icons. FIG. 7 is a schematic view showing the book copy screen 50 of the operation panel 4 for scanning an image printed on the book 30. Similarly, FIG. 8 is a schematic view showing the book copy screen 59A of the operation panel 4 when a beginning page top end scanning direction assignment icon 55 has been pressed. The beginning page top end scanning direction assignment icon 55 is used for scanning an image printed on the beginning page of the book 30 in a scanning direction from the top end to the bottom end. Similarly, FIG. 9 is a schematic view showing the book copy screen 59B of the operation panel 4 when a beginning page bottom end scanning direction assignment icon 56 has been pressed. The beginning page bottom end scanning direction assignment icon 56 is used for scanning an image printed on the beginning page of the book 30 in a scanning direction from the bottom end to the top end. The skip scan icon 53, the beginning page top end scanning direction assignment icon 55, and the beginning page bottom end scanning direction assignment icon 56, which are provided at the book copy screens 50, 59A, 59B, are unique to the second embodiment, are mainly explained below.

The skip scan icon 53 provided in the book copy screen 50, 59A, 59B is selected when a page of the book 30 placed on the platen 23 of the image scanning unit 7 is not copied or scanned. The beginning page top end scanning direction assignment icon 55 is selected when an image printed on the book 30 placed on the platen 23 of the image scanning unit 7 is scanned the first time in a direction from its top end to its bottom end, which is normal. A beginning page top end selection indication lamp 57 turns on when a user presses the beginning page top end scanning direction assignment icon 55 as shown in FIG. 8. Similarly, the beginning page bottom end scanning direction assignment icon 56 is selected when an image printed on the book 30 placed on the platen 23 of the image scanning unit 7 is required to be scanned the first time after a top end and a bottom end of the book 30 are horizontally inverted. A beginning page bottom end selection indication lamp 58 turns on when a user presses the beginning page bottom end scanning direction assignment icon 56 as shown in FIG. 9.

Figure 10:
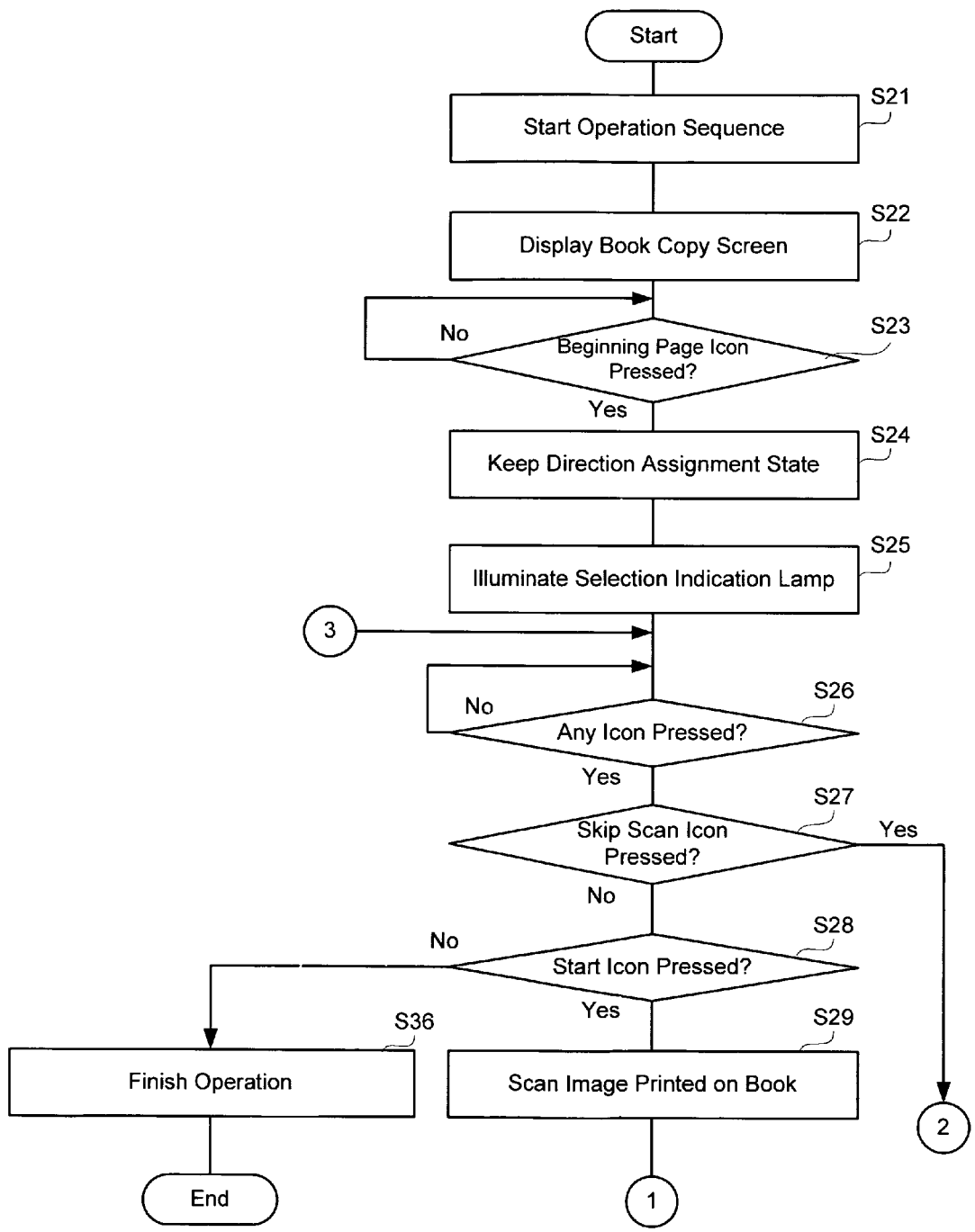
FIG. 10 is a flow diagram of an operation related to a second embodiment of an image processing device according to the present application.
Figure 11:
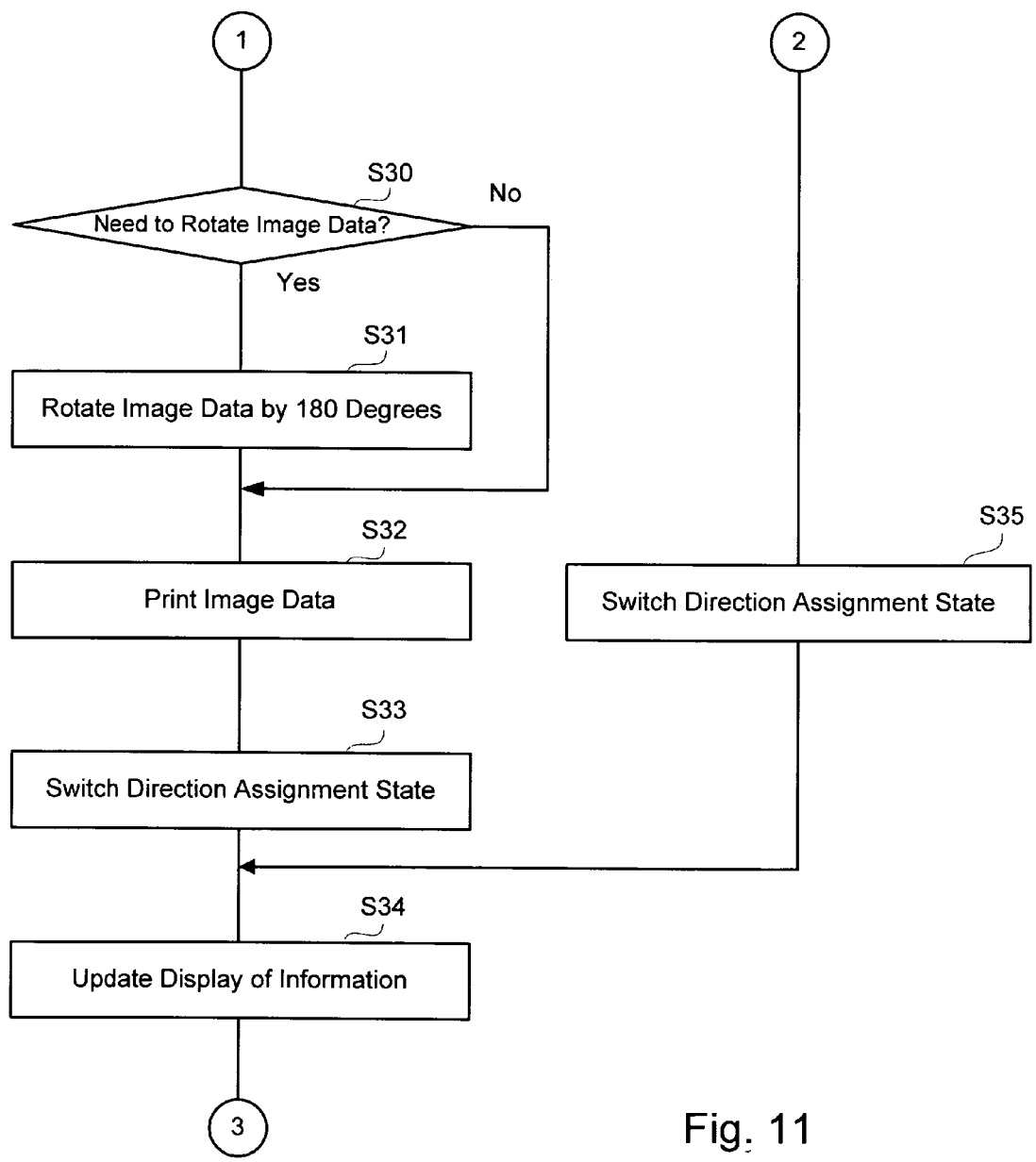
FIG. 11 is a flow diagram of an operation related to a second embodiment of an image processing device according to the present application.

The following is a description of the operation of the image processing device 15 according to the second embodiment. FIGS. 10 and 11 show divided flow diagrams of an operation related to the image processing device 15.

When a user of the image processing device 15 places the book 30 on the platen 23 of the image scanning unit 7 and operates the operation panel 4 provided at the image scanning unit 7, an operation sequence is started in the image processing device 15 (S21). A book copy screen 50 is displayed at the operation panel 4 based on the control by an image controlling unit 6 (S22). The image controlling unit 6 determines whether a beginning page top end scanning direction assignment icon 55 or a beginning page bottom end scanning direction assignment icon 56 is pressed or not through the operation panel 4. When either of those icons is pressed (Yes), the operation proceeds to step S24 from step S23. When none of those icons is pressed (No), the operation returns to step S23. In step S24, when the beginning page top end scanning direction assignment icon 55 is pressed, a value "0" for the direction assignment state 5A is kept as the scanning direction for a page of the book 30 based on the control by the image controlling unit 6. Similarly, when the beginning page bottom end scanning direction assignment icon 56 is pressed, a value "1" for the direction assignment state 5A is kept as the scanning direction for a page of the book 30.

In step S25, when the beginning page top end scanning direction assignment icon 55 is pressed, the book copy screen 50 of FIG. 7 is updated to the book copy screen 59A of FIG. 8, and the beginning page top end selection indication lamp 57 is illuminated based on the control by the image processing unit 6. Similarly, when the beginning page bottom end scanning direction assignment icon 56 is pressed, the book copy screen 50 of FIG. 7 is updated to the book copy screen 59B of FIG. 9, and the beginning page bottom end selection indication lamp 58 is illuminated based on the control by the image processing unit 6 (S25). The image controlling unit 6 determines whether any icons provided in the book copy screens 59A or 59B have been pressed or not through the operation panel 4. When any of those icons have been pressed (Yes), the operation proceeds to step S27 from step S26. When none of those icons has been pressed (No), the operation returns to step S26. In step S27, the image controlling unit 6 determines whether a pressed icon within the icons of the book copy screens 59A or 59B is the skip scan icon 53 or not through the operation panel 4. When the skip scan icon 53 has been pressed (Yes), the operation proceeds to step S35 from step S27. When the pressed icon is not the skip scan icon (No), the operation proceeds to step S28 from step S27.

After the operation proceeds from step S27 to step S28, the image controlling unit 6 determines whether a pressed icon within the icons of the book copy screens 59A or 59B is a color start icon 51 or a B/W start icon 52 or not through the operation panel 4. When the pressed icon is the color start icon 51 or the B/W start icon 52 (Yes), the operation proceeds to step S29 from step S28. When the pressed icon is not the color start icon 51 nor the B/W start icon 52 (No), the operation proceeds to step S36 from step S28. After the operation proceeds from step S28 to step S29, the operation panel 4 notifies the image controlling unit 6 of a copy operation start. Then, the image controlling unit 6 instructs the image scanning unit 7 to scan an image printed on the book 30. The image scanning unit 7 scans an image printed on the book 30 and converts the scanned image into image data. The image data is transferred from the image scanning unit 7 to a memory area 3 and is stored in the memory area 3. Then, in step S29, the image scanning unit 7 notifies the image controlling unit 6 of the completion of the scanning.

In step S30, a direction determination unit 8 determines whether it is necessary to rotate image data or not based on the control by the image controlling unit 6. Specifically, when the direction determination unit 8 reads a direction assignment state 5A provided in a setting memory unit 5, and a value "0" is set in the direction assignment state 5A, the direction determination unit 8 determines that it is not necessary to rotate image data because the scanning direction of the image sensor 22 is the same as the direction from the top end to the bottom end of the book 30, for example, shown in FIG. 2. Then, the operation proceeds to step S32. On the other hand, in step S30, when a value "1" is set in the direction assignment state 5A, the direction determination unit 8 determines that it is necessary to rotate image data because the scanning direction of the image sensor 22 is opposite to the direction from the top end to the bottom end of the book 30, for example, shown in FIG. 3. Then, the operation proceeds to step S31. The direction determination unit 8 sends the determination result to the image controlling unit 6. In step S31, the image controlling unit 6 instructs the image rotation unit 9 to rotate the image data of the current scanned page of the book 30 by 180 degrees. In other words, the orientation of the image data of the current image is rotated by 180 degrees. After the image rotation unit 9 rotates a direction of the image data stored in the memory area 3 by 180 degrees and re-stores the rotated image data in the memory area 3, in step S31, the image rotation unit 9 notifies the image controlling unit 6 of its operation.

After the operation proceeds from either steps S30 or S31 to step S32, the image controlling unit 6 instructs the image print unit 10 to print the image data. Then, at step S32, the image print unit 10 prints the image data. In step S33, after the image controlling unit 6 reads the direction assignment state 5A provided in the setting memory unit 5, the image controlling unit 6 sets an opposite value in the direction assignment state 5A. Specifically, in step S33, when a setting value of the direction assignment state 5A is "0," the image controlling unit 6 switches its value to "1" as an updated value of the direction assignment state 5A (S33). Similarly, when a setting value of the direction assignment state 5A is "1," the image controlling unit 6 switches its value to "0" as an updated value of the direction assignment state 5A. After the operation proceeds from step S27 to step S35, as in step S33, after the image controlling unit 6 reads the direction assignment state 5A provided in the setting memory unit 5, the image controlling unit 6 sets an opposite value against the current value (or switch the value). After the operation proceeds from either steps S33 or S35 to step S34, the image controlling unit 6 instructs the operation panel 4 to update the display of information in its screen. After step S34, the operation returns to step S26. When a user places a next page and subsequent pages of the book 30 on the platen 23 of the image scanning unit 7 and operates the operation panel 4, operations after step S26 are repeated. When the operation proceeds from step S28 to step S36, i.e., when the stop icon 54 of either of the book copy screens 59A and 59B is pressed, the image controlling unit 6 finishes the copy operation for the book 30.

In the image processing device 15 according to the second embodiment, after a user places the books 30 on the platen 23 of the image scanning unit 7, when the user assigns a scanning direction for a beginning page of the book 30 through the operation panel 4, every other scanned page data for a second or subsequent page is automatically inverted instead of requiring the user to assign a scanning direction of the book 30 for each page. Therefore, the image processing device 15 according to the second embodiment has the benefit of ease of use and has very simple operation of setting the scanning direction compared to the image processing device 1 of the first embodiment.

Third Embodiment

The following is a description of an image processing device 16 of a third embodiment. In the third embodiment, when a user places a book 30 on a platen 23 of an image scanning unit 7, the scanning direction (top to bottom or bottom to top) of image data for the scanned book 30 is automatically determined. Therefore, the third embodiment does not require the user to assign a scanning direction. Other structures with respect to the image processing device 16 are the same as those of the image processing device 1 of the first embodiment and those of the image processing device 15 of the second embodiment. In the third embodiment, structures that are different from the first and second embodiments are mainly explained in detail.

Figure 12:
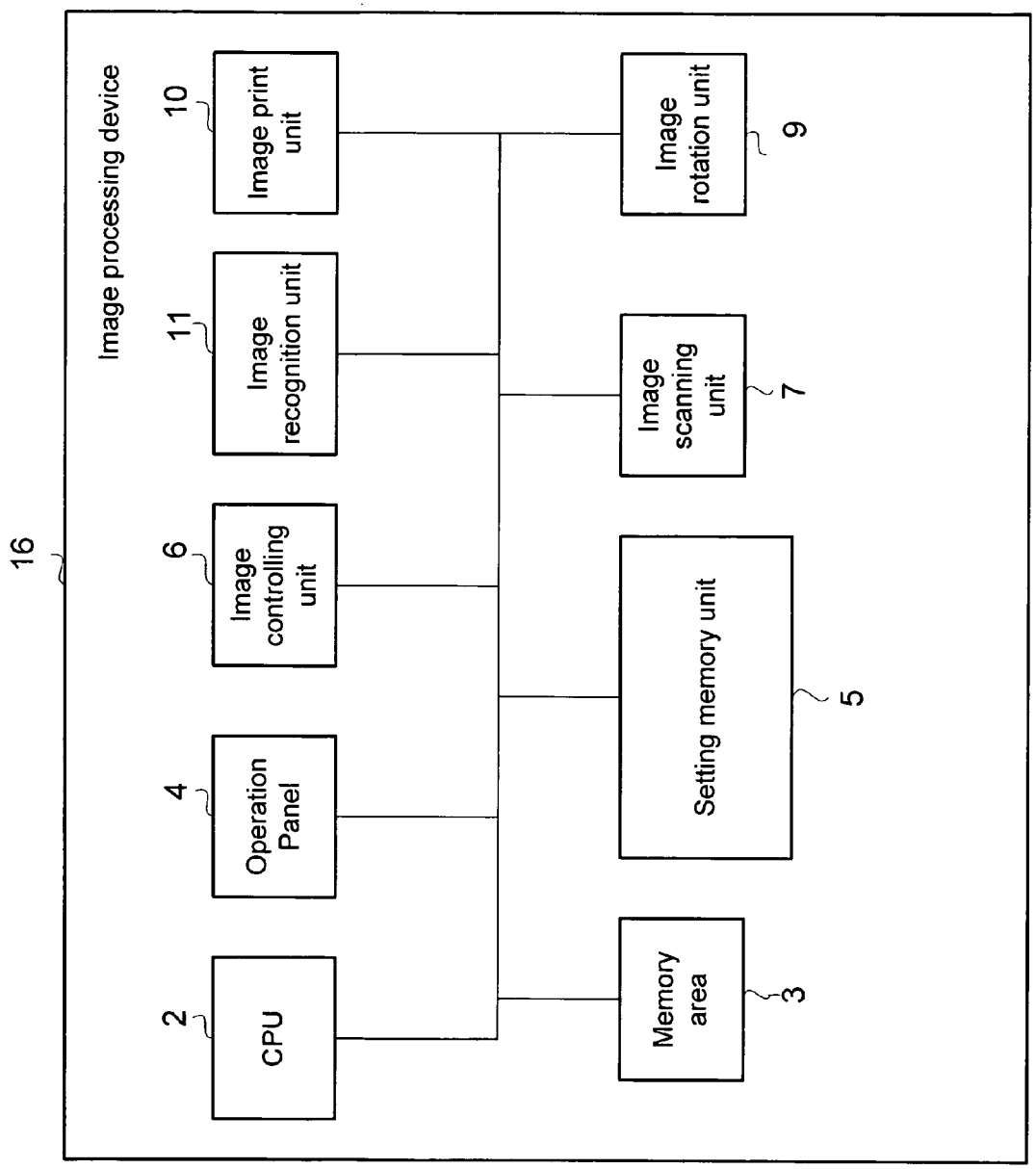
FIG. 12 is a schematic view of a third embodiment of an image processing device according to the present application.

The image processing device 16 according to the third embodiment is explained with reference to FIG. 12. FIG. 12 is a schematic view of the image processing device 16.

The image processing device 16 scans several pages of a book and converts them into image data. And then, after the image processing device 16 rotates a direction of the scanned image data in a certain direction, the image processing device 16 prints them on a medium or stores them into a memory. The image processing device 16 includes the following same structures of the first and second embodiments, a CPU 2, a memory area 3, an operation panel 4, a setting memory unit 5, an image controlling unit 6, an image scanning unit 7, an image rotation unit 9, and an image print unit 10, and an image recognition unit 11, which is unique to the third embodiment. In other words, the image processing device 16 according to the third embodiment has the image recognition unit 11 instead of the direction determination unit 8 of the first and second embodiments. That is, the image recognition unit 11 functions as a direction determination unit in this embodiment. There is no direction assignment state 5A provided in the setting memory unit 5 in the third embodiment. The image recognition unit 11 determines the direction of an image based on image data of the book 30 scanned by the image scanning unit 7.

Figure 13:
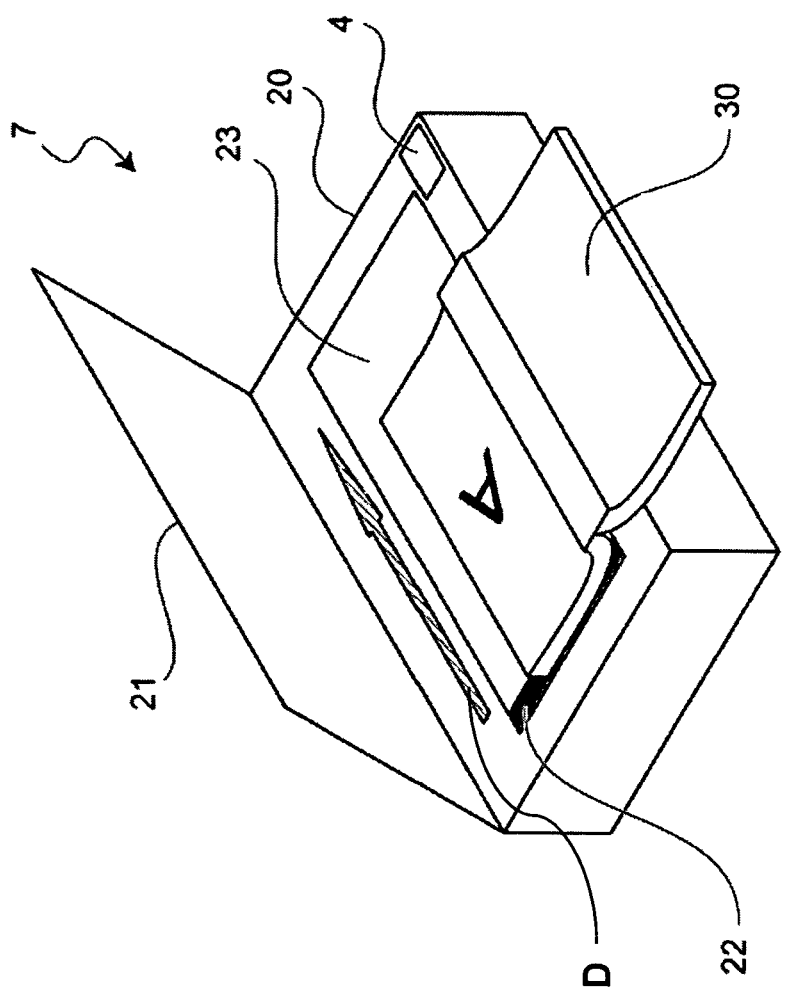
FIG. 13 is a schematic view of a third embodiment of an image processing device according to the present application and shows an image printed on a page of a book being scanned in a scanning direction from its top end to its bottom end by an image scanning unit.
Figure 14:
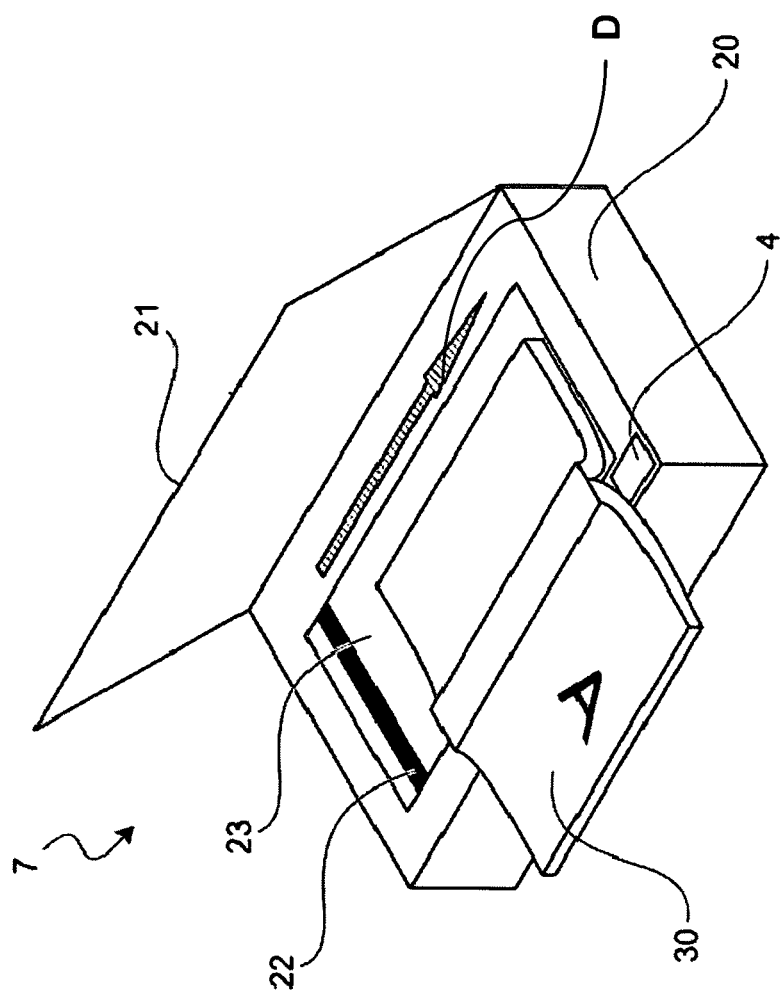
FIG. 14 is a schematic view of a third embodiment of an image processing device according to the present application and shows an image printed on a page of a book located in a horizontally inverted position, compared to FIG. 13, being scanned in a scanning direction from its bottom end to its top end by an image scanning unit.

The following is a detailed description of the structure and operation of the image scanning unit 7 configured in the image processing device 16 with reference to FIGS. 13 and 14. FIG. 13 is a schematic view illustrating the scanning of an image printed on a book 30 in a scanning direction from the top end to the bottom end by the image scanning unit 7. FIG.

14 is a schematic view of illustrating the scanning of an image printed on a book 30 located in a horizontally inverted position compared to FIG. 13 in a scanning direction from the bottom end to the top end by the image scanning unit 7.

Scanning an image printed on the book 30 in a scanning direction from the top end to the bottom end is described with reference to FIG. 13. The book 30 is placed on the platen 23 of the image scanning unit 7, with the top end of a printed image of the book 30 placed in the far left side of the platen 23 in the image scanning unit 7 in FIG. 13, which is a starting position of a scanning operation. When a user operates an operation panel 4 to run the image scanning unit 7, an image sensor 22, which is located in the far left side of the platen 23 in FIG. 13, scans the a page of the book 30 from the left toward the far right side in FIG. 13. Then, the image sensor 22 returns to the far left side, which is its original position. The operation of scanning an image printed on the book 30 in a scanning direction from the bottom end to the top end is explained with reference to FIG. 14. The book 30 is horizontally inverted (the positions of the top end and bottom end of the book are reversed) compared to FIG. 13 and is placed on the platen 23 of the image scanning unit 7 to scan an image printed on the book 30 with the top end of the printed image of the book 30 placed in the far right side of the platen 23 in the image scanning unit 7 in FIG. 14, which is an ending position of a scanning operation. When a user activates the image scanning unit 7 through the operation of an operation panel 4, an image sensor 22, which is located in the far left side of the platen 23 in FIG. 14, scans the book 30 from the left toward the far right side in FIG. 14. Then, the image sensor 22 returns to the far left side, which is its original position. The method for the operation of the operation panel 4 is given below in detail.

Figure 15:
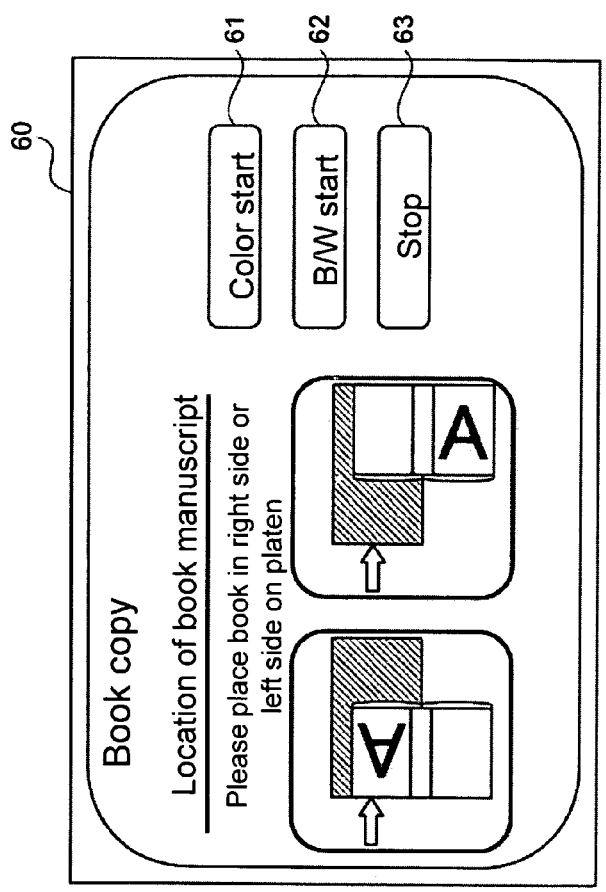
FIG. 15 is a schematic view of a book copy screen displaying an operation panel of a third embodiment of an image processing device according to the present application.

The structure and an operation of the operation panel 4 provided at the image scanning unit 7 are described below in detail with reference to FIG. 15. FIG. 15 is a schematic view of a book copy screen 60 displayed at the operation panel 4.

A book copy screen 60 of the operation panel 4 has a color start icon 61, a black and white (B/W) start icon 62, and a stop icon 63, which are the same in the first and second embodiments. In the third embodiment, when the user places the book 30 on the platen 23 and operates the operation panel 4 that is disposed in the image scanning unit 7, the scanning direction (top to bottom or bottom to top) of image data for the scanned book 30 is automatically determined. Therefore, scanning direction assignment icons and selection indication lamps, which are used in the first and second embodiments, are not provided.

Figure 16:
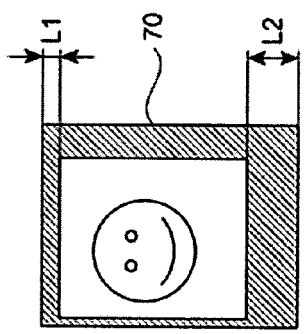
FIG. 16 is a schematic view of image data of an image on a page of a book scanned by an image scanning unit of a third embodiment of an image processing device according to the present application.

Next, image data 70 with respect to a book 30 scanned by an image scanning unit 7 is explained with reference to FIG. 16. FIG. 16 is a schematic view of image data 70 with respect to the book 30 scanned by the image scanning unit 7.

FIG. 16 is a schematic view of image data 70 of the book 30 scanned by the image scanning unit 7. The image data 70 is obtained under the following situation; a top end of a printed image with respect to the book 30 is placed in the far left side of a platen 23 in FIG. 13 that is a starting position of a scanning operation. A peripheral portion of the image data 70 is displayed in black color. The peripheral portion represents an area outside of the page. In the image data 70, a top end line number, L1, represents the length of the black marginal portion between the top end of the image data 70 and the first white color portion from the top end, and a bottom end line number, L2, represents the length of the black marginal portion between the bottom end of the image data 70 and the first white portion from the bottom end. As shown, the top end line number L1 is configured to have a smaller number than the bottom line number L2.

Figure 17:
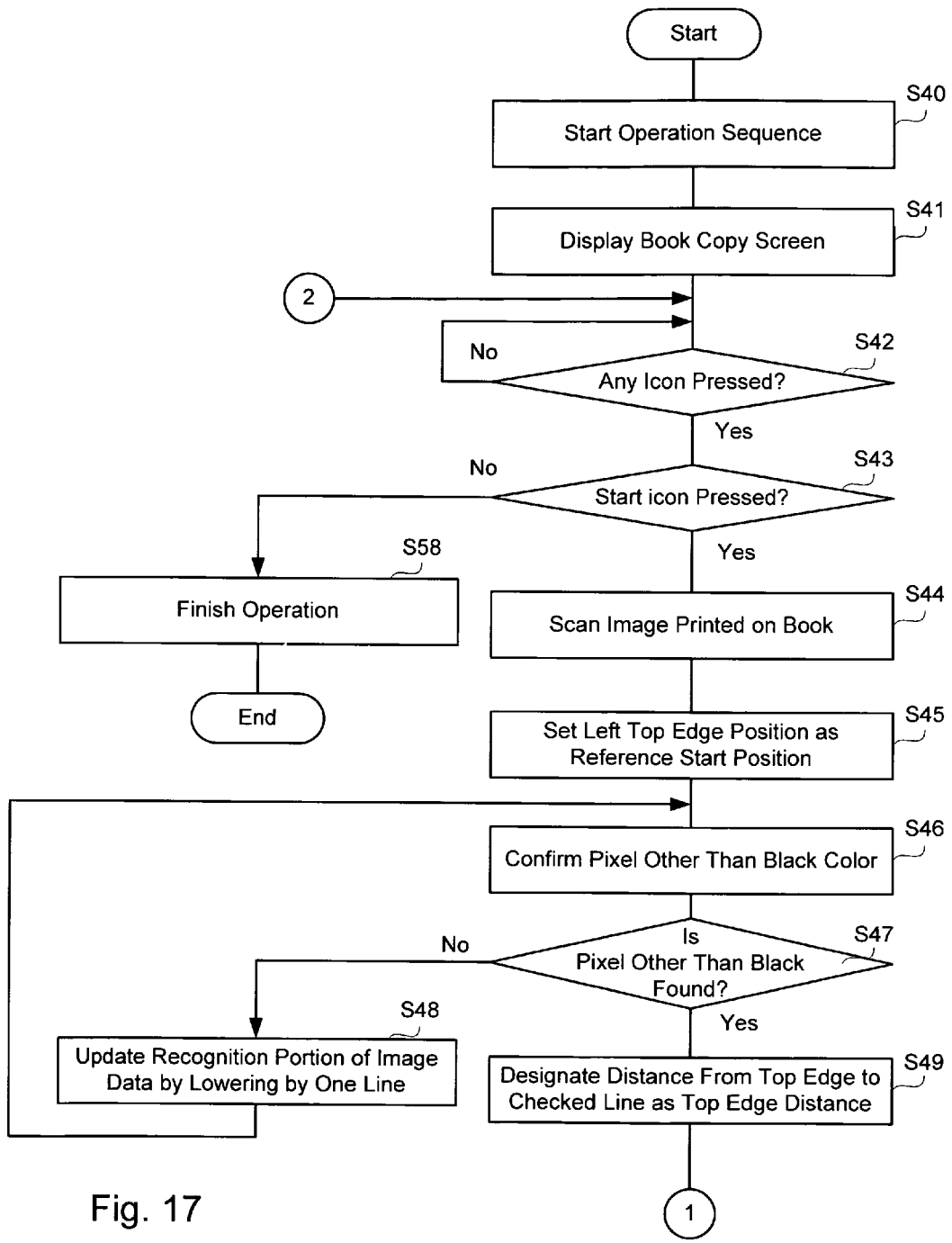
FIG. 17 is a flow diagram of an operation related to a third embodiment of an image processing device according to the present application.
Figure 18:
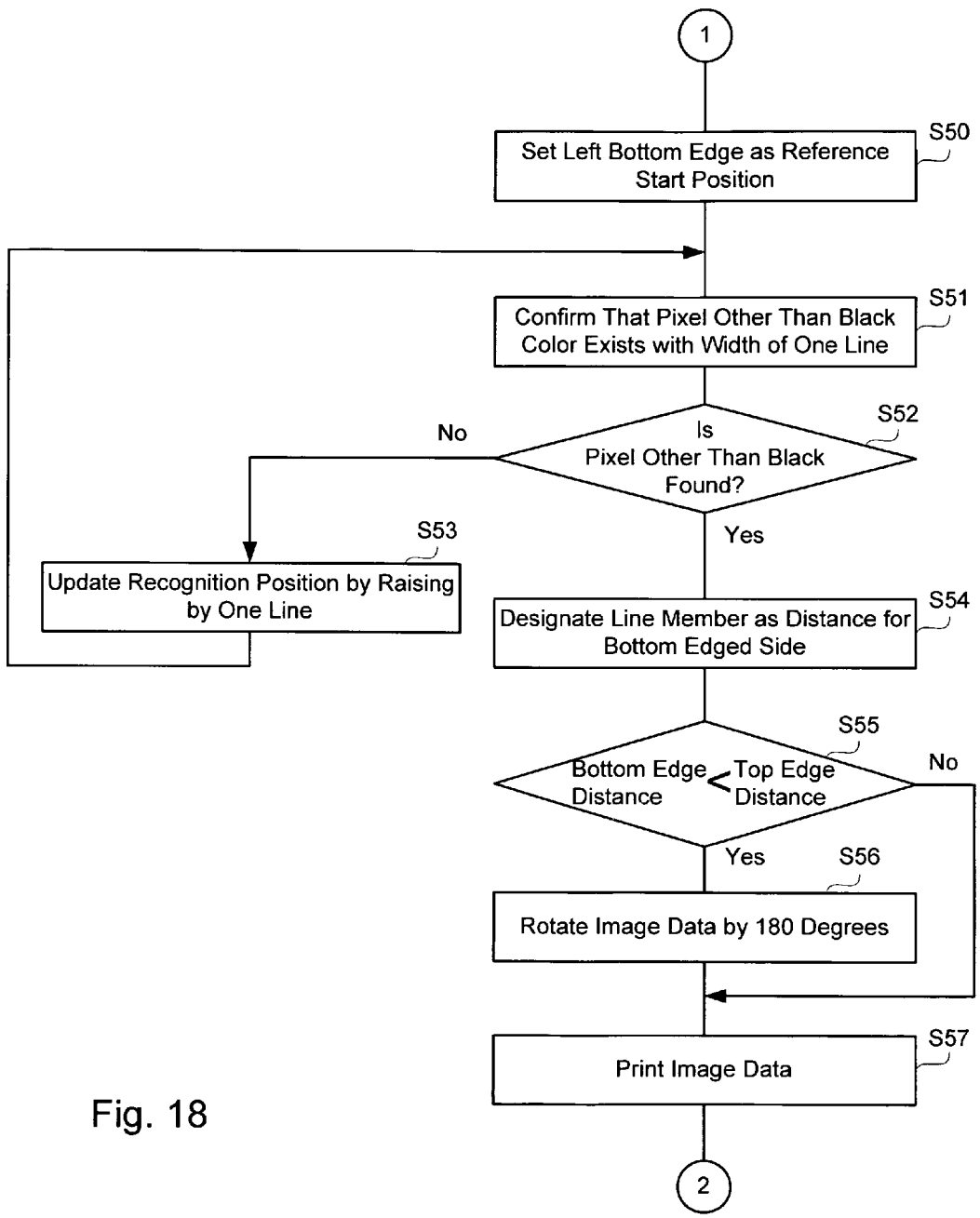
FIG. 18 is a flow diagram of an operation related to a third embodiment of an image processing device according to the present application.

Operation of the image processing device 16 according to the third embodiment is described below. FIGS. 17 and 18 show divided flow diagrams of an operation related to the image processing device 16.

When a user of the image processing device 16 places the book 30 on the platen 23 of the image scanning unit 7 and operates the operation panel 4 provided at the image scanning unit 7, an operation sequence is started with respect to the image processing device 16 (S40). A book copy screen 60 is displayed at the operation panel 4 based on the control by an image controlling unit 6 (S41). The image controlling unit 6 determines whether any icons provided in the book copy screen 60 have been pressed or not through the operation panel 4. When there an icon has been pressed (Yes), the operation proceeds to step S43 from step S42. When no icon has been pressed (No), the operation returns to step S42. When the operation proceeds from step S42 to step S43, the image controlling unit 6 determines whether the pressed icon in the book copy screen 60 through the operation panel 4 is the color start icon 61 or the B/W start icon 62 (S43). When the pressed icon is either the color start icon 61 or the B/W start icon 62 (Yes), the operation proceeds to step S44 from step S43. When the pressed icon is not either the color start icon 61 or the B/W start icon 62 (No), the operation proceeds to step S58 from step S43.

When the operation proceeds from step S43 to step S44, the operation panel 4 notifies the image controlling unit 6 that the copy operation has started. Then, the image controlling unit 6 instructs the image scanning unit 7 to scan an image printed on the book 30. The image scanning unit 7 scans an image printed on the book 30 and converts the scanned image into image data 70. The image data 70 is transferred from the image scanning unit 7 to a memory area 3 and is stored in the memory area 3. Then, in step S44, the image scanning unit 7 notifies the image controlling unit 6 that the scanning is completed. In step S45, the image recognition unit 11 sets a left top edge position in FIG. 16 as a reference start position of the image data 70. Then, in step S46, in order to confirm whether a pixel other than a black pixel, which corresponds to an area outside of the image data 70, exists or not, the image recognition unit 11 refers to each pixel from the top edge portion of the image data 70 with a width of one line each from right to left. When the image recognition unit 11 determines whether a pixel other than a black pixel is contained in pixels in one line width of the image data 70, and a pixel other than a black pixel is found (Yes), the operation proceeds to step S49 from step S47. When the image recognition unit 11 determines whether that a pixel other than a black pixel is not found (No), the operation proceeds to step S48 from step S47. When the operation proceeds from step S47 to step S48, a recognition portion of the image data 70 is updated by lowering the position by one line with the image recognition unit 11. Then, the operation returns to step S46. In other words, when all pixels for one line are black, the operation repeats to check the next lower line until a pixel other than a black pixel is detected (S48). When the operation proceeds from step S47 to step S49, the distance from the top edge of the image data 70 to the currently checked line is designated as a top edge distance. When a pixel other than a black pixel is detected, the line number is designated as the distance from the top edge side of the image data 70 (S49).

When the operation proceeds from step S49 to step S50, the image recognition unit 11 sets a left bottom edge position in FIG. 16 as a reference start position of the image data 70 (S50). Then, in order to confirm whether a pixel other than a black pixel, which corresponds to an area outside of the page, exists or not, the image recognition unit 11 refers to each pixel from the bottom edge portion of the image data 70 with a width of one line each from right to left (S51). In step S52, when the image recognition unit 11 determines whether a pixel other than a black pixel is contained in the pixels of one line width of the image data 70, and a pixel other than a black pixel is found (Yes), the operation proceeds to step S54. When the image recognition unit 11 determines that a pixel other than a black pixel is not found (No), the operation proceeds to step S53. When an operation proceeds from step S52 to step S53, a recognition portion of the image data 70 is updated by raising the position for one line by the image recognition unit 11. Then, the operation returns to step S51. In other words, when all pixels for one line are black, the operation repeats to check the next upper line until a pixel other than a black pixel is detected (S53). When the operation proceeds from step S52 to step S54, the distance from the bottom edge of the image data 70 to the currently checked line is designated as a bottom edge distance. When a pixel other than a black pixel is detected, the line number is designated as the distance from the bottom edge side of the image data 70 to the data representing the scanned page (S54). Next, the image recognition unit 11 compares the top edge distance obtained in step S49 and the bottom edge distance obtained in step S54. When the bottom edge distance is shorter than the top edge distance (Yes), the operation proceeds to step S56 (S55). When the bottom edge distance is equal to or longer than the top edge distance (No), the operation proceeds to step S57 (S55). Thus, the black marginal area of the image data 70 is vicinity image data in the vicinity of the scanned page, and the vicinity image data indicates the orientation, or direction, of the image data.

When the operation proceeds from step S55 to step S56, the image controlling unit 6 instructs the image rotation unit 9 to rotate the image data 70 with respect to the book 30 scanned by the image scanning unit 7 by 180 degrees. In the case that the top edge distance is longer than the bottom edge distance, it is assumed that the book 30 is scanned under the shown in FIG. 14. Therefore, the image data 70 should be rotated. After the image rotation unit 9 rotates the image data 70 stored in the memory area 3 by 180 degrees and re-stores the rotated image data 70 in the memory area 3, the image rotation unit 9 notifies the image controlling unit 6 of its operation (S56). After the operation proceeds from either steps S55 or S56 to step S57, the image controlling unit 6 instructs the image print unit 10 to print the image data 70. Then, after the image print unit 10 prints the image data 70 (S57), the operation returns to step S42. In step S42, when a user places a next page and subsequent pages of the book 30 on the platen 23 in the image scanning unit 7 and operates the operation panel 4 of the image scanning unit 7, operations after step S42 are repeatedly executed. When the operation proceeds from step S43 to step S58, i.e., when the stop icon 63 of the book copy screen 60 is pressed, the image controlling unit 6 finishes the copy operation for the book 30 (S58).

In the image processing device 16 according to the third embodiment, when a user places a book 30 on a platen 23 of an image scanning unit 7, the scanning direction (tip to bottom or bottom to top) of image data for the scanned page of the book 30 is automatically determined. Therefore, since the third embodiment does not require the user to assign the scanning direction, the third embodiment has the benefit of ease of use and very simple setting operations compared to the first and second embodiments.

Fourth Embodiment

An image processing device 17 according to a fourth embodiment is described below. In the fourth embodiment, when a user places a book 90, in which a distinction guide is tucked, on a platen 23 of an image scanning unit 7 and operates an operation panel 4 provided at the image scanning unit 7, a scanning direction (top to bottom or bottom to top) of image data for the scanned book 90 is automatically determined because of the specific pattern of the distinction guide tucked into the scanned book 90. Therefore, compared with the third embodiment, even when the book 90 is not correctly placed on the platen 23 in the far left side or the far right side, the fourth embodiment has the benefit that there is no misjudgment of the scanning direction of image data for the scanned book 90. Other structures with respect to the image processing device 17 in the fourth embodiment are the same as those of the image processing device 16 in the third embodiment. In the fourth embodiment, structures that are different from the third embodiment are mainly explained in detail.

Figure 19:
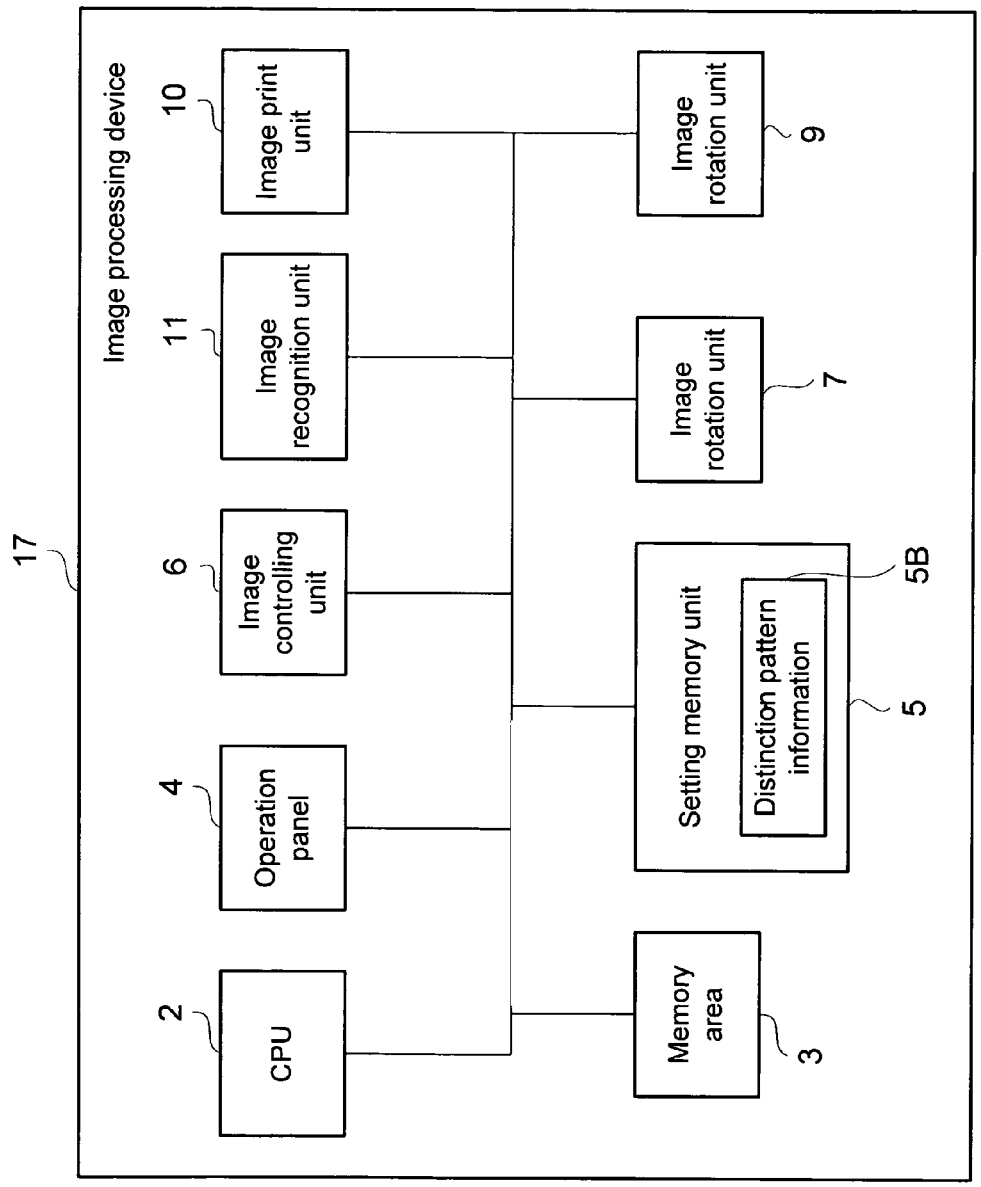
FIG. 19 is a schematic view of a fourth embodiment of an image processing device according to the present application.

The image processing device 17 according to the fourth embodiment is explained with reference to FIG. 19. FIG. 19 is a schematic view of the image processing device 17.

The image processing device 17 scans several pages of a book and converts them into image data. And then, after the image processing device 17 rotates a direction of the scanned image data in a certain direction, the image processing device 17 prints the data on a medium or stores the data into a memory. The image processing device 17 includes the following same structures of the third embodiment, a CPU 2, a memory area 3, an operation panel 4, a setting memory unit 5, an image controlling unit 6, an image scanning unit 7, an image rotation unit 9, an image print unit 10, and an image recognition unit 11. Distinction pattern information 5B, which is a structure unique to the fourth embodiment, is provided in the setting memory unit 5. The distinction pattern information 5B has a specific pattern with respect to a distinction guide 80 tucked in the book 90.

Figure 20:
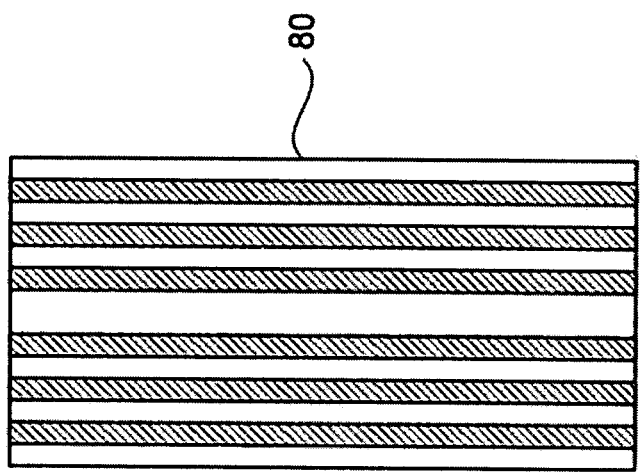
FIG. 20 is a schematic view of a distinction guide of a fourth embodiment of an image processing device according to the present application.
Figure 21:
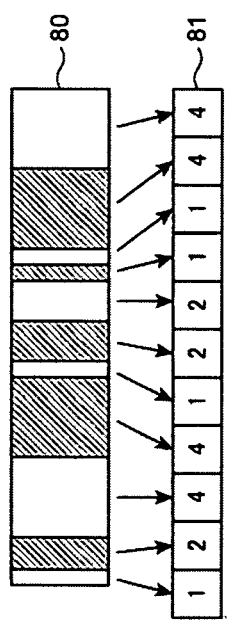
FIG. 21 is a schematic view of a distinction pattern information source with respect to a distinction guide of a fourth embodiment of an image processing device according to the present application.
Figure 22:
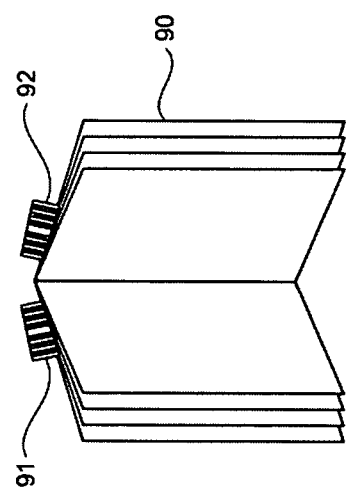
FIG. 22 is a schematic view of a book tucking with a distinction guide of a fourth embodiment of an image processing device according to the present application.

The distinction guide 80 is described below with reference to FIGS. 20, 21, and 22. FIG. 20 is a schematic view of a distinction guide 80. FIG. 21 is a schematic view of a distinction pattern information source 81 with respect to the distinction guide 80. FIG. 22 is a schematic view of a book 90 in which distinction guides 91 and 92 are tucked.

A distinction guide 80 is a mark and is provided as an accessory for an image processing device 17. The distinction guide 80 is made of, for example, a plastic material in a proximately rectangular shape. The distinction guide 80 has a white background with a printed pattern of several vertical lines in black color. A distinction pattern information source 81 is scanned with a width ratio of white and black lines, and the width of a far left white line is set as "1" in FIG. 21. As shown in FIG. 22, the distinction guides 80, such as distinction guides 91 and 92, are tucked and fixed in a page after a front cover page and in a page before a back cover page of the book 90, respectively.

Figure 23:
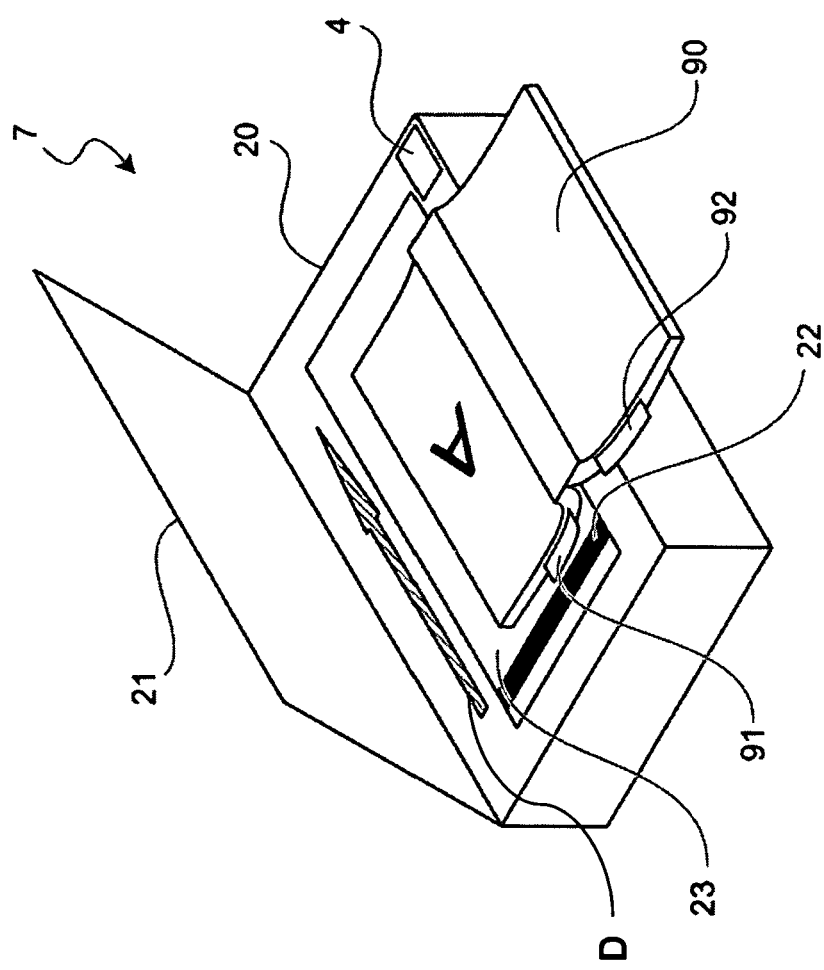
FIG. 23 is a schematic view of a fourth embodiment of an image processing device according to the present application and shows an image printed on a page of a book being scanned in a scanning direction from its top end to its bottom end by an image scanning unit.
Figure 24:
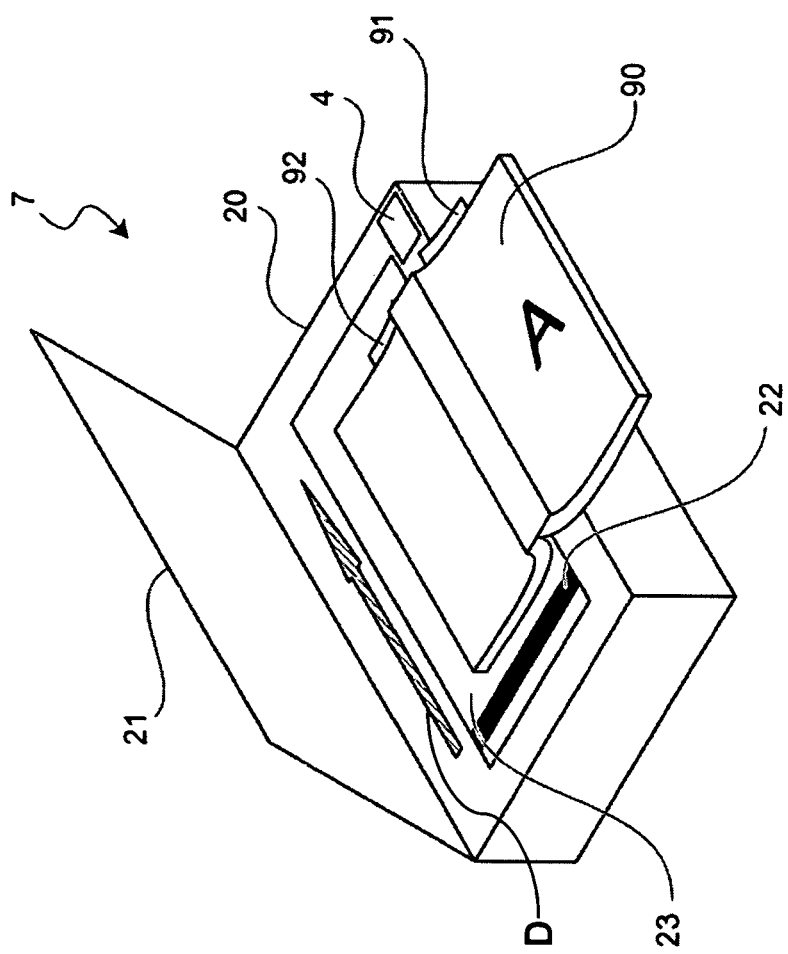
FIG. 24 is a schematic view of a fourth embodiment of an image processing device according to the present application and shows an image printed on a page of a book located in a horizontally inverted position compared to FIG. 23 being scanned in a scanning direction from its bottom end to its top end by an image scanning unit.

The following is a detailed description of the structure and operation with respect to an image scanning unit 7 configured in the image processing device 17 with reference to FIGS. 23 and 24. FIG. 23 is a schematic view of scanning of an image printed on a book 90, in which distinction guides 91 and 92 are tucked, in a scanning direction from the top end to the bottom end by an image scanning unit 7. FIG. 24 is a schematic view that illustrates scanning of an image printed on a book 90, in which distinction guides 91 and 92 are tucked, located in a horizontally inverted position compared to FIG. 23 in a scanning direction from the bottom end to the top end by an image scanning unit 7.

Scanning an image printed on a book 90, in which the distinction guide 91 is tucked, in a scanning direction from top to bottom is explained with reference to FIG. 23. The book 90, in which the distinction guide 91 is tucked, is placed on a platen 23 of the image scanning unit 7, with the top end of a printed image of the book 90 placed in the vicinity of the left side of the platen 23 in the image scanning unit 7 in FIG. 23, which is a starting position of a scanning operation. When a user operates the operation panel 4 to run the image scanning unit 7, the image sensor 22, which is located in the far left side of the platen 23 in FIG. 23, scans the distinction guide 91 and the book 90 from the left toward the far right side in FIG. 23. Then, the image sensor 22 returns to the far left side, which is its original position. The operation of scanning an image printed on the book 90, in which the distinction guide 92 is tucked, in a scanning direction from bottom to top is explained with reference to FIG. 24. The book 90, in which the distinction guide 92 is tucked, is horizontally inverted (the positions of the top and bottom ends are reversed) compared to FIG. 23, and is placed on the platen 23 of the image scanning unit 7 to scan an image printed on the book 90 with the bottom end of the printed image of the book 90 placed in the vicinity of the left side of the platen 23 in the image scanning unit 7 in FIG. 24, which is a starting position of a scanning operation. When a user initiates the image scanning unit 7 through the operation of an operation panel 4, an image sensor 22, which is located in the far left side of the platen 23 in FIG. 24, scans the distinction guide 92 and the book 90 from the left toward the far right side in FIG. 24. Then, the image sensor 22 returns to the far left side, which is its original position. The method for the operation of the operation panel 4 is described below in detail.

The structure and operation of the operation panel 4 provided at the image scanning unit 7 are explained in detail with reference to FIG. 25. FIG. 25 is a schematic view of a book copy screen 100 displayed at the operation panel 4.

A book copy screen 100 of the operation panel 4 has a color start icon 101, a black and white (B/W) start icon 102, and a stop icon 103, which are the same structures as those of the first, second, and third embodiments. In the fourth embodiment, when a user places a book 90, in which the distinction guides 91 and 92 are tucked, on a platen 23 of an image scanning unit 7 and operates an operation panel 4 provided at the image scanning unit 7, a scanning direction top to bottom or bottom to top) of image data for the scanned book 90 is automatically determined. Therefore, scanning direction assignment icons and selection indication lamps, which are used for the first and second embodiments, are not provided.

Next, image data with respect to a book 90 scanned by an image scanning unit 7 is explained with reference to FIGS. 26A and 26B. FIGS. 26A and 26B are schematic views of image data with respect to the book 90, in which distinction guides 91 and 92 are tucked, scanned by the image scanning unit 7.

FIG. 26A is a schematic view of image data 110 with respect to the book 90, in which the distinction guide 91 is tucked, and that is placed on a platen 23 of the image scanning unit 7, with the top end of a printed image of the book 90 placed in the vicinity of the left side of the platen 23 in the image scanning unit 7 in FIG. 23, which is a starting position of a scanning operation. The distinction guide 91 appears as a distinction guide image 111 at the top end of the image data 110 in FIG. 26A with respect to the scanned book 90. Similarly, FIG. 26B is a schematic view of image data 112 with respect to the book 90, in which a distinction guide 92 is tucked. The book 90 is horizontally inverted (the positions of the top and bottom of the book are reversed) compared to FIG. 23 and is placed on the platen 23 of the image scanning unit 7 to scan an image printed on the book 90 with the bottom end of the printed image of the book 90 placed in the vicinity of the left side of the platen 23 in the image scanning unit 7 in FIG. 24, which is a starting position of a scanning operation. The distinction guide 92 appears as a distinction guide image 113 at the bottom end of the image data 112 in FIG. 26B with respect to the scanned book 90.

Figure 27:
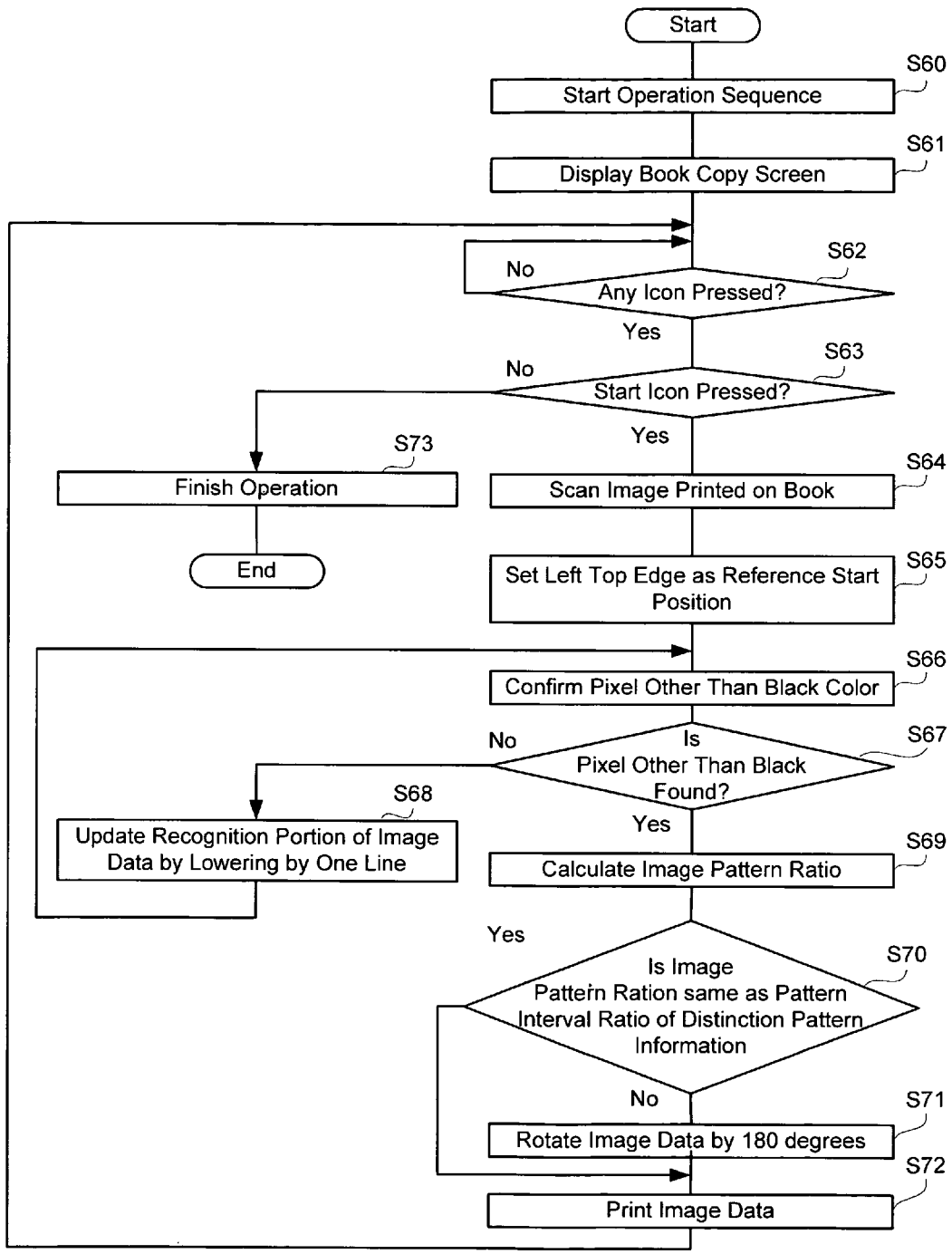
FIG. 27 is a flow diagram of an operation related to a fourth embodiment of an image processing device according to the present application.

Operation of the image processing device 17 according to the fourth embodiment is described below. FIG. 27 is a flow diagram of the operation of the image processing device 17.

When a user of the image processing device 17 places the book 90, in which distinction guides 91 and 92 are tucked, on the platen 23 of the image scanning unit 7 and operates the operation panel 4 provided at the image scanning unit 7, an operation sequence is started with respect to the image processing device 17 (S60). Descriptions of steps S61-S68 are omitted because they are the same as steps S41-S48 in the flow diagram of FIG. 17, which is associated with the third embodiment. When the operation proceeds from step S67 to step S69, one of the distinction guides 91, 92 is scanned, and image data after a non-black pixel (a detected pixel that is other than black) through the end of one line of the image data is written in a memory area 3. Then, a ratio (or image pattern ratio) of the number of pixels between a section in which a pixel other than black exists and a section in which a pixel other than black does not exist is calculated (S69). Next, the image recognition unit 11 refers to the distinction pattern information 5B. When a specific pattern interval ratio with respect to the distinction pattern information 5B is the same as the image pattern ratio calculated at step S69, there is no need to rotate the scanned image data because the distinction guide is provided at the beginning of the book 90 (Yes). Therefore, the operation proceeds to step S72 from step S70. However, when a specific pattern interval ratio with respect to the distinction pattern information 5B is different from the image pattern ratio calculated at step S69, it is necessary to rotate the scanned image data because a detected specific pattern does not match the distinction guide but is a portion of the book 90 (No at step S70). Thus, the image recognition unit 11 functions as a direction determination unit in this embodiment. Therefore, the operation proceeds to step S71 from step S70. A description of steps S71-S73 is omitted because they are the same as steps S56-S58 in the flow diagram of FIGS. 17 and 18, which are associated with the third embodiment. Thus, in this embodiment, the distinction guides 91, 92 provide vicinity image data in the vicinity of the scanned page, and the vicinity image data indicates the orientation, or direction, of the image data.

In the image processing device 17 according to the fourth embodiment, when a user places a book 90, in which distinction guides 91 and 92 are tucked, on a platen 23 of an image scanning unit 7 and operates the operation panel 4 provided at the image scanning unit 7, a scanning direction (top to bottom or bottom to top) of image data for the scanned book 90 is automatically determined because of the specific pattern of the distinction guides 91 and 92 (for example, the specific pattern interval ratio with respect to the distinction pattern information) tucked into the scanned book 90. Therefore, even though the book 90 is not correctly placed on the platen 23 in the far left side or the far right side, the fourth embodiment has a benefit that there is no misjudgment of the scanning direction (top to bottom or bottom to top) of image data for the scanned book 90.

In the first through fourth embodiments, a multifunction machine that is an exemplary application of the image processing device is described. However, the image processing device can be applied to other devices that process images, such as a scanner, a copier, a facsimile machine, a printer, and an automatic document scanning machine. In the first through fourth embodiments, the image controlling unit 6 instructs the image print unit 10 to print image data under the following situations; (1) when it is required to rotate an image, the image is printed after its rotation, and (2) when it is not required to rotate an image, the image is printed without rotation. However, the present application can be applied such that when a removable device, such as a USB memory device, is connected to the image processing device, image data that requires rotation is stored after its rotation, and image data that does not require rotation is stored without rotation. Similarly, in the first through fourth embodiments, when an external device such as a computer is connected to the image processing device, the image controlling unit 6 instructs the sending of image data that requires rotation with rotation and the sending of image data that i does not require rotation without rotation.

Similarly, in the first through fourth embodiments, the image rotation unit 9 is a part of a scanner as a unit. However, the present application can be applied such that image data that requires rotation has information of the direction determination unit 8 (without its rotation) stored in a removable device, such as a USB memory. Alternatively, after image data that requires rotation is sent (without rotation) to an external device such as a computer, image data that has information of a direction determination unit 8 is sent. In the third embodiment, the scanning direction (top to bottom or bottom to top) of a page is determined through the outside area of a page of the book 30. However, the present application can be applied such that the scanning direction is determined through a shadow of gradations caused by the thickness of a book 30. Similarly, in the third embodiment, detection of a non-black pixel is used to obtain top and bottom edge distances. However, the present application can be applied such that a distance to an image is determined through an existing line of a blank portion that has the same width of the book.

What is claimed is:

1. An image processing device comprising:
   an image scanning unit for scanning a plurality of pages of a book and generating image data;
   a storage unit in which data related to direction of the image data is stored;
   a direction determination unit for determining a direction of a page unit of the image data; and
   an image rotation unit for changing a direction of a page unit of the image data based on the direction determined by the direction determination unit, wherein
   the storage unit receives vicinity image data scanned in the vicinity of a page image by the image scanning unit as data indicating the direction of image data of the page image, and
   the direction determination unit determines the direction of the page image data based on the vicinity image data.

2. The image processing device according to claim 1, wherein the storage unit stores a direction in which an image of each page is scanned by the image scanning unit as the data related to direction for each page, and
   the direction determination unit determines that the direction of a page unit of the image data corresponds to the direction in which the corresponding page was scanned.

3. The image processing device according to claim 2, further comprising
   an input device having a first selector by which a first direction is inputted and a second selector by which a second direction is inputted, wherein
   the image rotation unit rotates one of the image data scanned in the first direction and the image data scanned in the second direction by 180 degrees, so that both the image data scanned in the first direction and the image data scanned in the second direction are oriented the same direction.

4. The image processing device according to claim 3, wherein the first direction and the second direction differ by 180 degrees.

5. The image processing device according to claim 2, wherein
   the storage unit stores a direction of a first page scanned by the image scanning unit,
   the direction determination unit determines that even pages of the image data are oriented in a first direction and determines that odd pages of the image data are oriented in a second direction, and
   the image rotation unit rotates the image data of one of the even pages and the odd pages so that all pages of image data are oriented in the same direction.

6. The image processing device according to claim 1, wherein the direction determination unit determines an image pattern of the vicinity image data and determines the direction of a page unit of the image data based on the image pattern.

7. The image processing device according to claim 6, wherein the image rotation unit rotates a page unit of the image data according to the image pattern.

8. The image processing device according to claim 6, wherein the direction determination unit detects a mark, which indicates the direction of the image data and determines the direction of the image data based on the mark.

9. The image processing device according to claim 8, wherein the mark is a guide tucked in the book.

10. The image processing device according to claim 1, wherein the direction determination unit determines the direction of a page unit of the image data through a distinction area not contained in an area of the page being scanned, the distinction area being located in the vicinity of the page being scanned.

11. The image processing device according to claim 10, wherein the image rotation unit rotates and aligns the direction of the image data according to a dimension of an area of the page on which no image is detected.

12. The image processing unit according to claim 1, wherein the book is scanned with its pages opened.

13. A method of processing images comprising:
    receiving scanned image data of a first page of a pair of open pages of a book, in an image processing unit;
    recognizing first image characteristics in the vicinity of the book, in the image processing unit, to automatically determine the orientation of the scanned image data of the first page, the first image characteristics being image characteristics of the image data associated with the first page;
    receiving scanned image data of a second page of the pair of open pages, in the image processing unit, wherein the second page is adjacent to the first page in the book, and wherein the scanned image data of the second page is initially received in an orientation that is opposite to that of the scanned image data of the first page;
    recognizing second image characteristics in the vicinity of the book, in the image processing unit, to automatically determine the orientation of the scanned image data of the second page, the second image characteristics being image characteristics of the image data associated with the second page; and
    rotating the scanned image data of one of the first page and the second page, in the image processing unit, so that the scanned image data of the first page and the scanned image data of second page are oriented in the same direction, according to the recognized first and second image characteristics.

14. The method of processing images according to claim 13, wherein the method further comprises receiving information from a user interface that indicates the direction in which each page of the book is oriented.

15. The method of processing images according to claim 13, wherein the method further comprises automatically rotating the scanned image data of one of an odd page and an even page so that the image data of all pages is oriented in the same direction.

16. The method of processing images according to claim 13, wherein the method further comprises receiving pattern data from a distinction pattern attached to the book and comparing that data to stored pattern data to determine the orientation of the first page.

* * * * *